June 6, 1961  J. T. ATOR ET AL  2,987,182
DETECTING APPARATUS
Filed Sept. 10, 1956  7 Sheets-Sheet 1

INVENTORS
JOE T. ATOR
WALLACE P. CHASE
MARC G. DREYFUS
JULE F. HARRAH
DONNE I. HARRIS
BY
ATTORNEYS

June 6, 1961  J. T. ATOR ET AL  2,987,182
DETECTING APPARATUS
Filed Sept. 10, 1956   7 Sheets-Sheet 2

INVENTORS
JOE T. ATOR
WALLACE P. CHASE
MARC G. DREYFUS
JULE F. HARRAH
DONNE I. HARRIS
BY
ATTORNEYS

June 6, 1961 J. T. ATOR ET AL 2,987,182
DETECTING APPARATUS
Filed Sept. 10, 1956 7 Sheets-Sheet 3
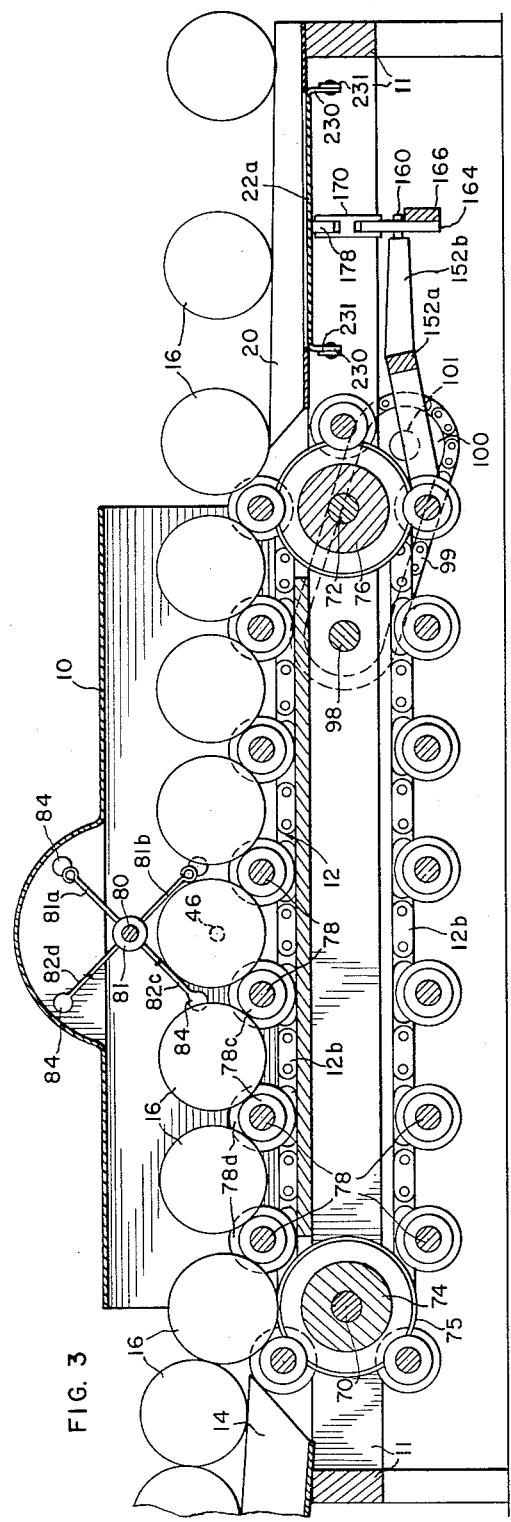
FIG. 3
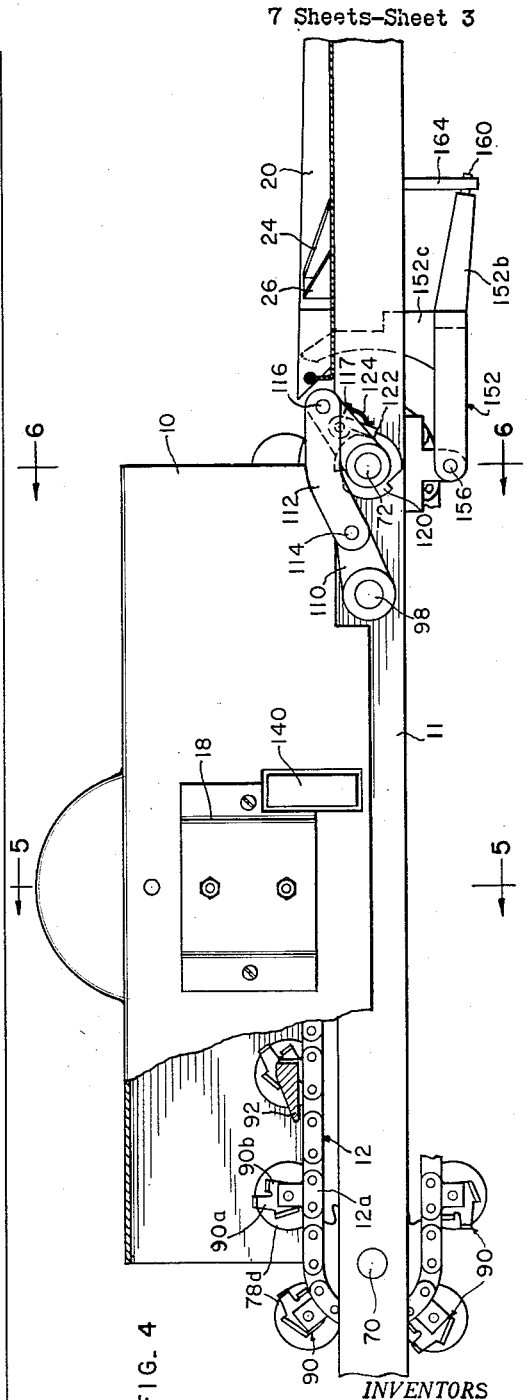
FIG. 4
INVENTORS
JOE T. ATOR
WALLACE P. CHASE
MARC G. DREYFUS
JULE F. HARRAH
DONNE I. HARRIS
BY 
ATTORNEYS June 6, 1961  J. T. ATOR ET AL  2,987,182
DETECTING APPARATUS
Filed Sept. 10, 1956  7 Sheets-Sheet 4
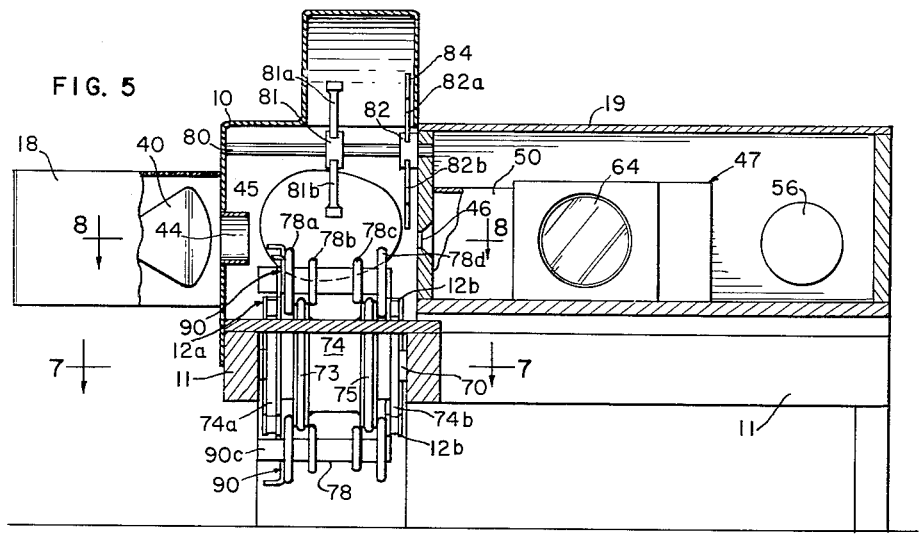
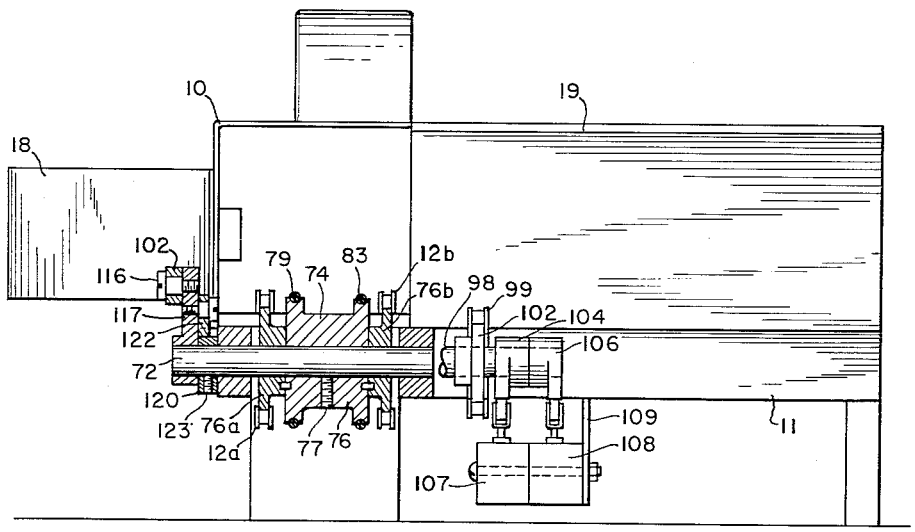
INVENTORS
JOE T. ATOR
WALLACE P. CHASE
MARC G. DREYFUS
JULE F. HARRAH
DONNE I. HARRIS
BY
ATTORNEYS

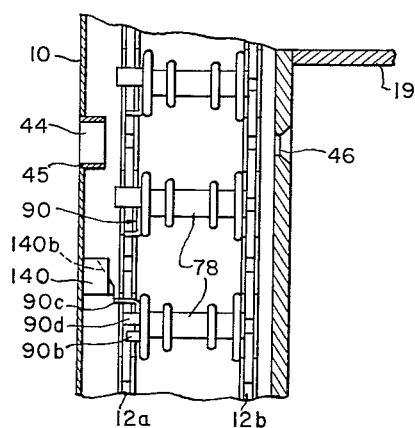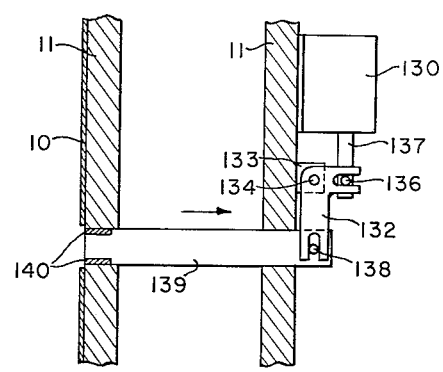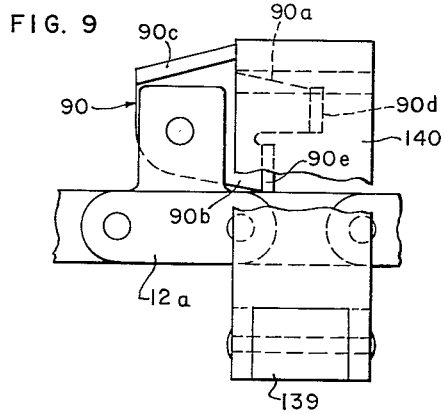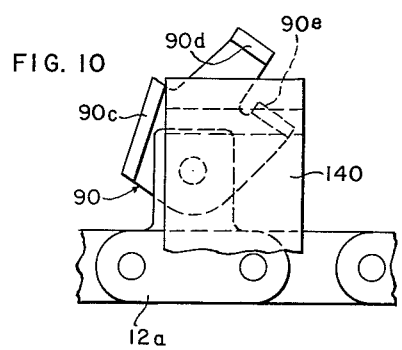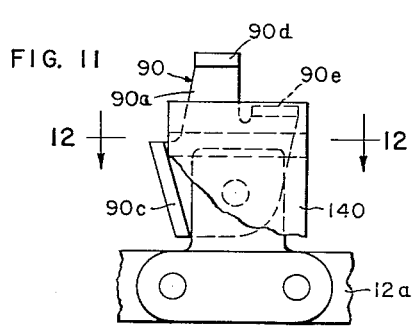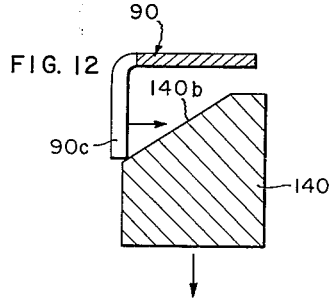

June 6, 1961  J. T. ATOR ET AL  2,987,182
DETECTING APPARATUS
Filed Sept. 10, 1956  7 Sheets-Sheet 6

INVENTOR.
JOE T. ATOR
WALLACE P. CHASE
MARC G. DREYFUS
JULE F. HARRAH
DONNE I. HARRIS
BY
ATTORNEYS

INVENTORS
JOE T. ATOR
WALLACE P. CHASE
MARC G. DREYFUS
JULE F. HARRAH
DONNE I. HARRIS
ATTORNEYS

United States Patent Office 2,987,182
Patented June 6, 1961

2,987,182
DETECTING APPARATUS
Joe T. Ator, San Fernando, Wallace P. Chase, La Canada, Marc G. Dreyfus, Sherman Oaks, Jule F. Harrah, Corona del Mar, and Donne I. Harris, Los Angeles, Calif., assignors to General Precision, Inc., a corporation of Delaware
Filed Sept. 10, 1956, Ser. No. 608,929
17 Claims. (Cl. 209—111)

This invention relates to apparatus for testing for the presence of a particular material in a specimen. The invention is more particularly concerned with apparatus for detecting blood in eggs and for automatically directing eggs containing blood to a receiving station distinct from the receiving station for eggs free of blood.

Chicken eggs and other types of eggs often contain blood spots, principally in the albumen. Although an egg having such blood is not rendered inedible, its presence usually causes the cook or housewife not only to reject eggs having blood spots but creates ill will toward the supplier of such eggs. Because of this, many attempts have been made in the past to sort from a supply of eggs those eggs containing blood so that the eggs will not find their way into the hands of the general consumer.

Although the present invention has general utility in sorting many types of specimens, it finds particular application in sorting eggs and in rejecting those that contain blood. For this reason, the invention will be described as applied to testing of eggs. Whether testing eggs or other specimens, the specimens should be capable of transmitting or passing light. Furthermore, a different spectral distribution of light should pass through the specimen when the specimen has foreign matter than when the specimen does not have foreign matter.

The apparatus responds only to the presence or absence of blood in the egg by employing a differential technique. This differential technique can be used because a first percentage of light passes through an egg at a critical wave length when the egg contains blood and a second percentage of light passes through the egg at the critical wave length when the egg does not contain blood. However, approximately the same amount of light passes through the egg at other wave lengths whether the egg does or does not contain blood.

A first photoelectric tube is included to reecive the light passing through the egg at the critical wave length and a second photoelectric tube is included to receive the light passing through the tube at one or more other wave lengths different from the critical wave length. The control effect of the apparatus is made dependent upon the difference in the outputs of the two photoelectric tubes. This causes the control effect to be independent of variations in the absolute level of light incident upon the egg. In this way, signals can be produced which accurately indicate the presence or absence of blood in eggs. This results in a sorting operation which is accurate and which is not susceptible to spurious signals produced by changes in the absolute light level resulting from variations in the density of successive specimens or for any other reason. Apparatus is also included for providing a positive and reliable sorting operation to separate the eggs containing blood from the eggs not containing blood in accordance with the signals which are produced.

In a preferred embodiment of the invention, two distinct wave lengths of light passing through the egg are received by one of the photoelectric tubes. The wave lengths are chosen so that substantially the same percentage of light passes through the egg at each wave length in the presence or in the absence of foreign matter. A third wave length of light passing through the specimen is received by the second photoelectric tube. This third wave length is chosen so that a different percentage of light passes through an egg having foreign matter as compared with the percentage of light passing through an egg not having foreign matter. This third wave length is selected to have a value intermediate the first two wave lengths. The three wave lenghs are chosen so that the average percentage of light passing through the egg at the first two wave lengths is substantially equal to the percentage of light passing through the egg at the third wave length in the absence of foreign matter but is different from the percentage of light passing through the egg at the third wave length in the presence of foreign matter.

By selecting the wave lengths as described in the preceding paragraph a simplication is obtained in the electrical control system. The reason is that the system may be balanced for specimens free from a particular material and may develop a pulse or other electrical indication in the presence of the particular material to produce a suitable control effect. This control effect can be used to actuate discriminating apparatus so that eggs free from blood can be fed to a first receiving station and eggs containing blood can be fed to a second receiving station. The eggs at the first station can be packaged for general sale to the public and the eggs at the second station can be packaged for special distribution to animal food companies or other commercial establishments.

In the drawings:

FIGURE 3 is a sectional view taken substantially on the line 3—3 of FIGURE 2 and shows in detail a conveyor for transporting the specimens past the test station and also shows an intermittent drive mechanism for the conveyor;

FIGURE 4 is a fragmentary front elevational view, partly in section, of the conveyor and the drive mechanism for imparting intermittent movement to the conveyor and also illustrates a series of pivotable members which are adapted to be actuated upon the presence of blood in eggs to produce a separation between these eggs and the eggs not containing blood;

FIGURE 5 is a sectional view substantially on the line 5—5 of FIGURE 4 and illustrates an egg supported at the test station and also shows details of the conveyor and of a member used for shielding the photoelectric apparatus at the test station during the time that successive eggs are moved by the conveyor to the testing position;

FIGURE 6 is a sectional view substantially on the line 6—6 of FIGURE 4 and illustrates details of the main drive for the conveyor and of a cam-operated switching arrangement included in the control system of the apparatus;

FIGURE 7 is a fragmentary sectional view substantially on the line 7—7 of FIGURE 5 and illustrates a solenoid controlled mechanism for selectively pivoting the actuating members shown in FIGURE 4 in response to control signals indicating that a particular egg contains blood;

FIGURE 8 is a fragmentary sectional view taken substantially on the line 8—8 of FIGURE 5 and further illustrates the solenoid-controlled mechanism and its coaction with the pivotable actuating members shown in FIGURES 4 and 7.

FIGURE 9 is an enlarged fragmentary front-elevational view of one of the actuating members shown in FIGURE 4 and of a block movable by the solenoid shown in FIGURE 7 for an egg containing blood and illustrates the disposition of the actuating member relative to the block as the actuating member is approaching the block;

FIGURE 10 is an enlarged fragmentary front-elevational view of the members shown in FIGURE 9 and illustrates an intermediate disposition of the actuating member when the member is pivoted by the block;

FIGURE 11 is an enlarged fragmentary front-elevational view of the members shown in FIGURE 9 and illustrates the final disposition of the actuating member when the member is pivoted by the block;

FIGURE 12 is an enlarged fragmentary sectional view substantially on the line 12—12 of FIGURE 11 and illustrates how the actuating member returns the block to the original position of the block after the actuating member has been pivoted in a manner similar to that shown in FIGURES 9 to 11, inclusive;

Figures 15, 16:
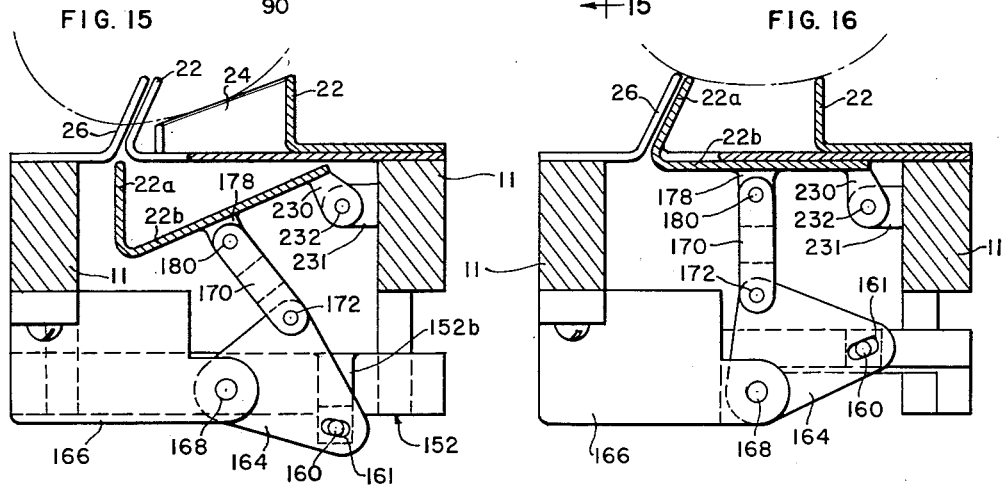
FIGURE 15 is an enlarged sectional view substantially on the line 15—15 of FIGURE 14 and illustrates the discriminating mechanism after the mechanism has been actuated by the pivoted actuating members to direct to the second of the receiving stations an egg containing blood.
Figure 17:
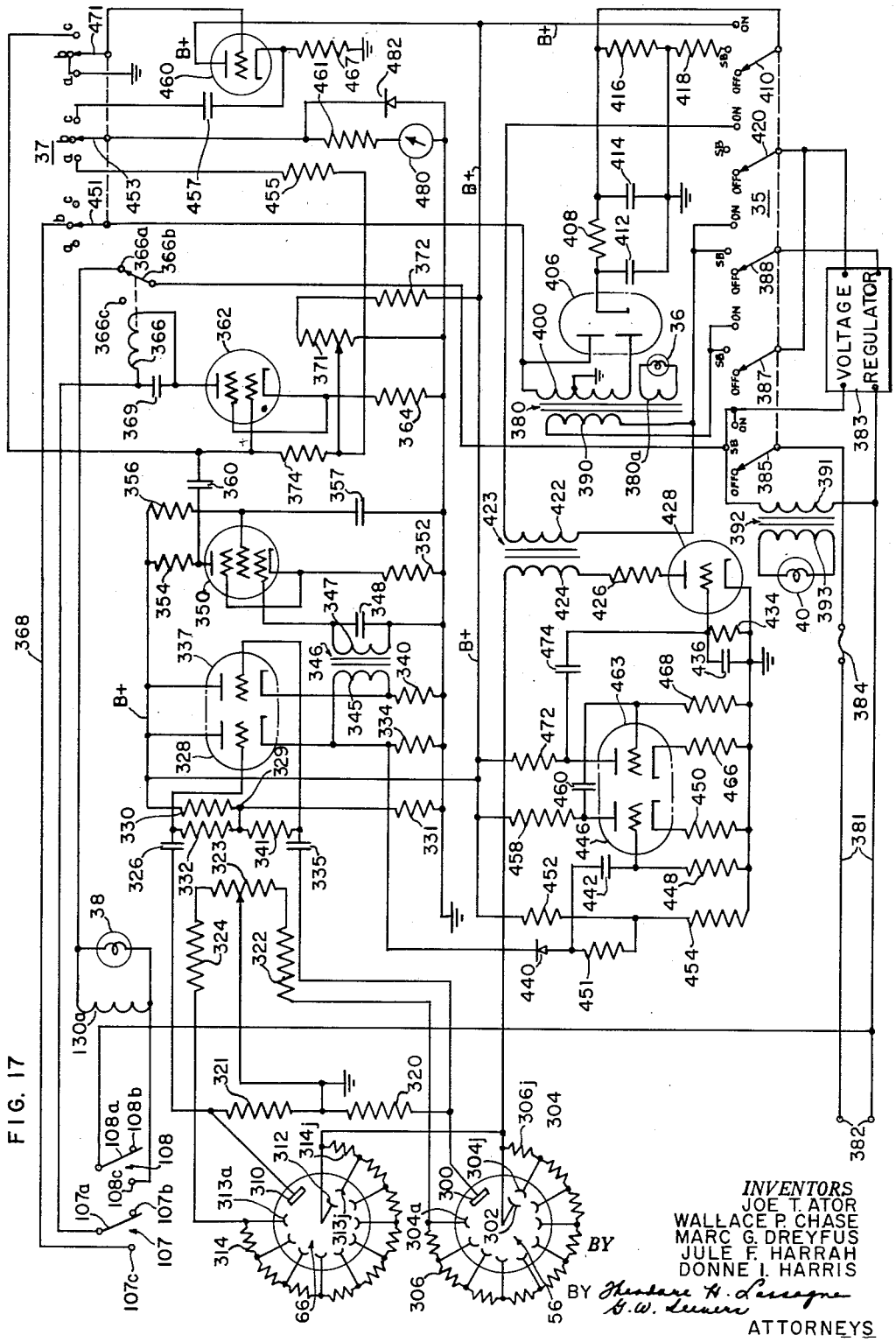

FIGURE 16 is an enlarged sectional view similar to that shown in FIGURE 16 and illustrates the disposition of the members shown in FIGURE 16 when an egg free from blood is directed to the first receiving station; and FIGURE 17 is a schematic representation of an electrical control system forming a part of the apparatus and includes certain of the members illustrated from a mechanical standpoint in the previous figures.

Figure 1:
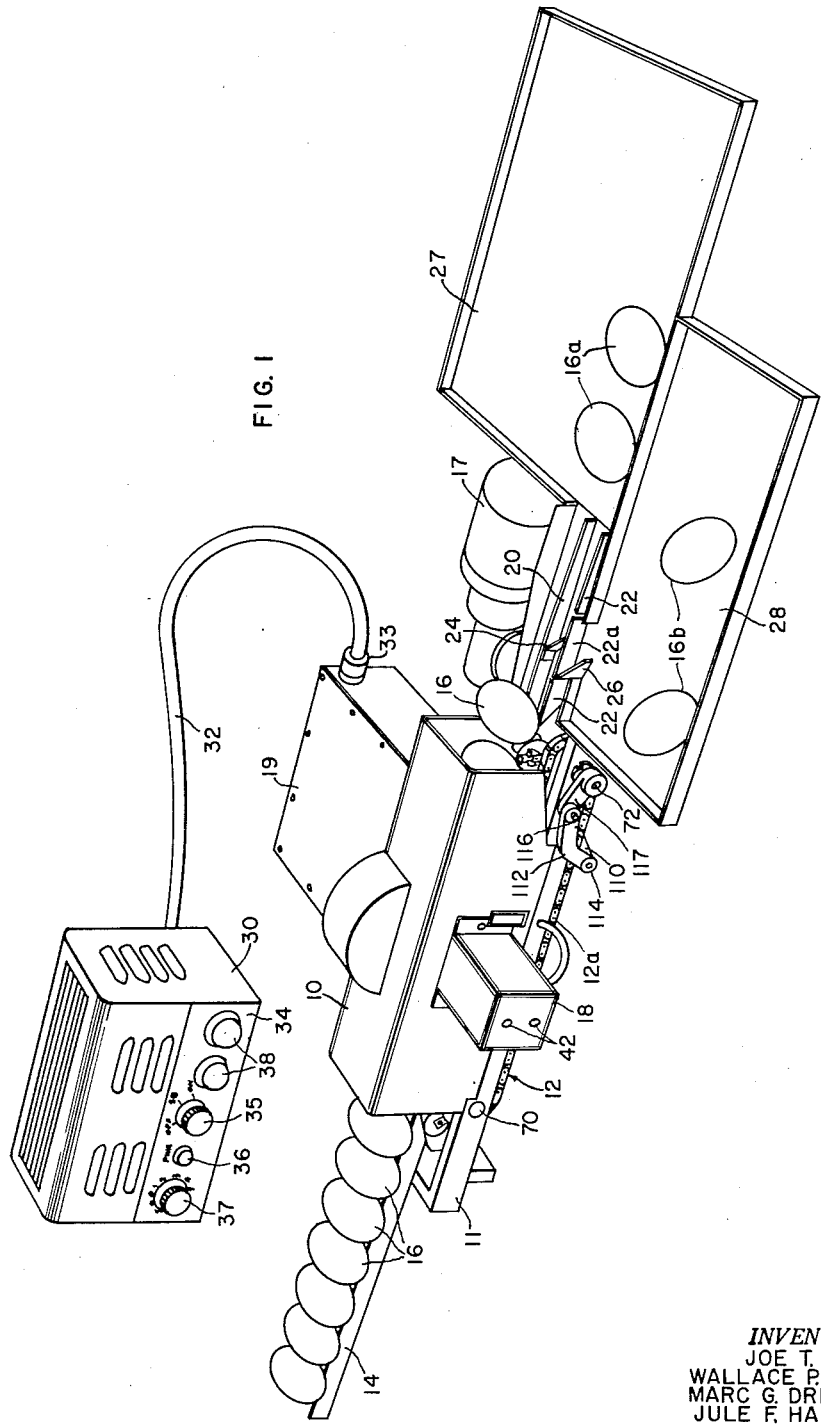
FIGURE 1 is a perspective view of apparatus constituting one embodiment of the invention and in which specimens such as eggs are drawn in succession past a test station and are automatically deposited in first or second receiving stations dependent upon whether or not the specimens contain foreign matter such as blood.

With particular reference now to FIGURE 1, the illustrated embodiment of the invention includes an open-ended elongated housing 10 illustrated as having a rectangular cross-section. The housing 10 and a conveyor 12 are supported on a table 11. The conveyor 12 includes a pair of endless chains 12a and 12b disposed in spaced and parallel relationship to each other. The conveyor 12 extends lengthwise over the upper surface of the table 11 and through the open-ended housing 10 and returns by way of the underside of the table.

A trough 14 is mounted on the table 11 at the left end of the table and is disposed toward the left in FIGURE 1 from the end of the table. The purpose of the trough 14 is to receive the specimens such as the eggs 16 and to feed these specimens to the conveyor 12. The trough is, therefore, tilted upwardly at a slight angle so that the specimens may roll down the trough and onto the conveyor 12. Under the driving action of an electric motor 17, the conveyor 12 receives the eggs from the trough 14 and transports the eggs past a test station in the housing 10. The eggs 16 are then deposited on a fixedly positioned guide track 20 and a guide track 22 having a pivotable section 22a.

A guide track 24 is positioned between the tracks 20 and 22 in contiguous relationship to the track 20 at one end. The track 24 extends from the track 20 to the pivotable section 22a of the track 22 at an oblique angle relative to the tracks 20 and 22. A second angled guide track 26 extends from track 22 in spaced and substantially parallel relationship to the guide track 24. The guide tracks 20 and 22 terminate in a first receiving station which may take the form of a pan 27, and the guide tracks 24 and 26 terminate in a second receiving station which may take the form of a pan 28.

An opaque chassis 18 is mounted on one side of the housing 10 between the left and right ends of the housing. The chassis 18 houses a light source 40 (FIGURE 2) which directs light through the eggs as the eggs are drawn through the housing 10 by the conveyor 12. A second chassis 19 is mounted on the other side of the housing 10 directly opposite to the chassis 18. The chassis 19 houses certain control equipment such as a pair of photoelectric tubes and a lens and filter system, all of which will be described in detail subsequently.

The electrical circuits and controls forming a part of the apparatus are mounted in a separate chassis 30. This chassis is electrically connected through a cable 32 to the photoelectric tubes in the chassis 19 and to other electrical members in the apparatus. The cable 32 contains a plurality of insulated connecting leads and is connected into a conventional receptacle in the chassis 19 as by a suitable plug 33.

The chassis 30 has a control panel 34 for the manual controls and indicating lamps disposed within the system. For example, a manually operated knob for a power selector switch 35 extends through the front panel. The switch 35 has three positions corresponding to "off," "stand-by" and "on." A power-indicating lamp 36 is also mounted on the control panel 34, as is a manually controlled knob for a multi-position test switch 37. One or more reject indicating lamps 38 are included. These lamps are energized when the specimen under test has a particular material in it.

The operation of the apparatus shown in FIGURE 1 is briefly as follows: The eggs 16 or other specimens to be tested are placed on the trough 14 so as to roll or slide down the trough to the conveyor 12. The eggs 16 are then intermittently advanced by the conveyor 12 to a test station between the beam of light directed from the chassis 18 to the photoelectric tubes in the chassis 19. The photoelectric tubes respond to the light passing through the successive specimens so as to obtain a downward pivotal movement of the track section 22a whenever an egg is detected as containing a blood spot.

After testing, the eggs 16a having no blood spots roll down the guide tracks 20 and 22 to the receiving station formed by the pan 27. However, whenever track section 22a is pivoted downwardly, eggs 16b having blood spots are engaged by the guide tracks 24 and 26 and are directed to the receiving station formed by the pan 28. All of the specimens in the pan 27 can now be packaged for general sale, and all of the specimens in the pan 28 can be used for special distribution such as to baking companies.

Figure 2:
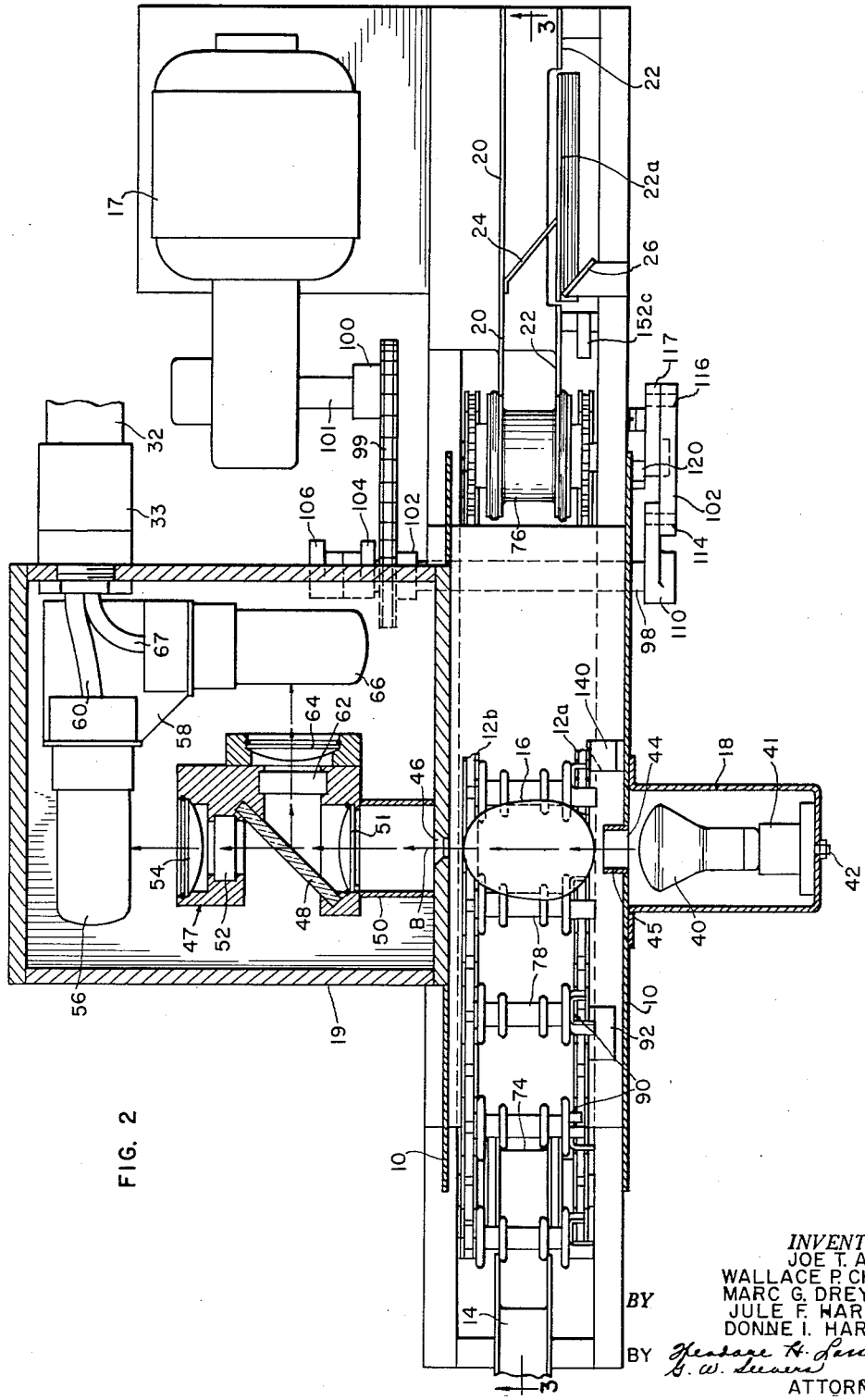
FIGURE 2 is a top plan view, partly in section, of the apparatus shown in FIGURE 1 and particularly illustrates on a somewhat enlarged scale certain optical and photoelectric members utilized at the test station.
Figure 13:
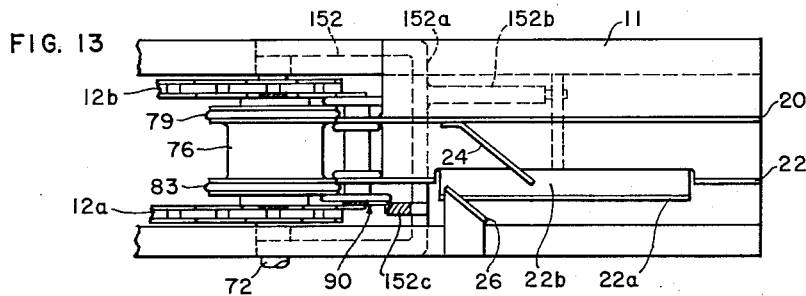
FIGURE 13 is a fragmentary top plan view, partly in section, of the trailing end of the conveyor and particularly shows discriminating members which are controlled to direct the eggs either to a first receiving station or to a second receiving station in accordance with the presence or absence of blood in the eggs.

Reference is now made to FIGURE 2 which particularly shows the light source 40 supported within the chassis 18 and also shows the optical system and photoelectric tubes supported within the chassis 19. The light source 40 is conveniently in the form of a light bulb screwed into a receptacle 41. The receptacle 41 is in turn mounted on the front wall of the chassis 18 as by screws 42. Electrical energy is fed to the light source 40 through suitable electric leads (not shown in FIGURE 2).

The wall of the housing 10 adjacent the chassis 18 is provided with an annular aperture 44 which receives a cylindrical hood 45. The hook 45 extends from the aperture 44 into the housing 10. A second aperture 46 is provided in the front wall of the chassis 19 and is axially aligned with the aperture 44. In this way, light from the source 40 is directed through each egg 16 as the specimen becomes positioned at the test station by the conveyor 12. The light passing through the egg 16 then passes into the interior of the chassis 19 for reception by the photoelectric tubes within the chassis.

The chassis 19 supports a bracket 47 which in turn supports a mirror 48 which is partially aluminized. The mirror 48 is disposed in a vertical plane and at approximately 45° to an optical axis B which extends from the light source 40 through the apertures 44 and 46. The surface of the mirror 48 is half-silvered so that a portion such as approximately 50 percent of the light rays incident on the mirror passes through the mirror and the other portion of the light rays is reflected by the mirror.

A hood 50 is supported between the brackets 47 and the front wall of the chassis 19 to direct toward the mirror 48 all of the light passing through the aperture 46. A lens 51 is supported by the bracket 47 at the rear end of the hood 50 and is provided with outer dimensions corresponding to the inner dimensions of the hood. The lens 51 is supported by the bracket 47 in a vertical plane across the optical axis B described above. The lens 51 has properties for collimating the light from the source 40 and for directing the light in substantially parallel rays toward the half-silvered mirror 48.

A filter 52 is supported in a vertical plane by the bracket 47 across the optical axis B so that the portion of the light traveling through the half-silvered mirror 48 also passes through this filter. Behind the filter 52 and also across the optical axis B is a lens 54 which is supported in a vertical plane by the bracket 47. The lens 54 focuses the light passing through the filter 52 and directs the light toward a light-sensitive member such as a photoelectric tube 56. The photoelectric tube 56 is supported in a receptacle 58 mounted on the walls of the chassis 19. Electrical leads 60 extend from the photoelectrical tube 56 into the cable 32, which in turn extends to the chassis 30 in FIGURE 1 as previously described. The photoelectric tube 56 may be of the photomultiplier type such as that constructed by the Radio Corporation of America and presently designated as "Type 6328" by that company.

As previously noted, a portion of the light incident on the mirror 48 from the lens 51 is reflected by the mirror. After reflection, this light travels along a path substantially perpendicular to the optical axis B because of the angle of 45° provided between the mirror and the optical axis B. A filter 62 is supported by the bracket 47 in a vertical plane across this path. A lens 64 is also supported by the bracket 47 directly behind the filter 62 in the direction of the light travel and in a plane substantially parallel to the filter. This causes the portion of the light reflected by the mirror 48 to pass through the filter 62. This reflected light is then focused by the lens 64 and is directed toward a light-sensitive member such as a photoelectric tube 66 having characteristics similar to the tube 56. The tube 66 is also supported in the receptacle 58 and is provided with electric leads 67 which extend into the cable 32 for coupling to the chassis 30.

The filter 52 is designed to pass light only at a suitable wave length such as approximately 575 millimicrons and in a narrow band of wavelengths on both sides of 575 millimicrons when it is desired to detect blood spots in eggs. Another filter may be included in the filter 52 to trap all of the light in the wavelengths below approximately 540 millimicrons and above approximately 610 millimicrons.

The filter 62 may actually be formed from two separate portions each designed to pass light at a distinct wavelength. For example, one portion of the filter 62 may be provided with a suitable characteristic for passing light at a wavelength of approximately 555 millimicrons and in a narrow range of wavelengths on each side of 555 millimicrons. The other portion of the filter 62 may be provided with characteristics for passing light only at a wavelength of approximately 595 millimicrons and in a narrow range on each side of 595 millimicrons. Another filter may be included to trap all of the light having wavelengths below 540 millimicrons and above 610 millimicrons. A more complete discussion of the filter action discussed above may be found, for example, in co-pending application, SN 544,131, filed November 1, 1955.

It has been found that eggs pass or translate substantially the same percentage of light at the wavelengths of 555 and 595 millimicrons regardless of whether they contain blood spots or not. However, it has also been found that the eggs pass or translate different percentages of incident light at 575 millimicrons when an egg has a blood spot as compared with the amount of light passed by the egg at that same wave length if the egg were free from such blood spots. This means that substantially the same amount of light is directed toward the photoelectric tube 66 whether the egg under test has a blood spot or not. However, a different amount of light is directed toward the photoelectric tube 56 for the egg when it has a blood spot as compared with the amount of light to the tube when the egg does not have such a blood spot.

More specifically, the arrangement is such that when an egg having no blood spot intercepts the light from the source 40, light of a certain intensity is directed toward the photoelectric tube 66 at the wave length of 595 millimicrons and light of a lower intensity is directed toward the tube 66 at the wavelength of 555 millimicrons. The average amount of light at 555 and 595 millimicrons is substantially the same as the intensity of light directed toward the photoelectric tube 56 at the wave length of 575 millimicrons when the egg has no blood spot. However, when an egg has a blood spot, the light directed toward the photoelectric tube 56 is of lower intensity than the average light directed toward the photoelectric device 66. This results from the absorption by the egg of an increased amount of light at 575 millimicrons when the egg has a blood spot. The photoelectric tubes 56 and 66 are connected in a differential manner so that no control signal is produced when the average light directed toward both tubes is substantially equal. When the amount of light directed toward the tube 56 is less than the average amount of light directed toward the tube 66, a control pulse is produced to indicate an egg with a blood spot.

FIGURE 3 shows more clearly the conveyor 12 and the endless chain 12b. As shown in FIGURE 3, the conveyor 12 extends around a pulley 74 which is mounted on a rotatable shaft 70 at the end of the table 11 adjacent to the trough 14. The conveyor 12 also passes around a second pulley 76 which is mounted on a rotatable shaft 72 at the other end of the table 11. As shown more clearly in FIGURE 5, a pair of rubber rings 73 and 75 extend annularly around the periphery of the pulley 74 at spaced positions in the axial direction of the pulley. The rubber rings 73 and 75 operate as bumpers to prevent breakage of the eggs 16 as the eggs roll down the trough 14 and reach the pulley. In like manner, a pair of rubber rings 79 and 83 extend annularly around the periphery of the pulley 76 at spaced positions in the axial direction of the pulley to prevent breakage of the eggs. The rings 79 and 83 are best seen in FIGURE 6.

As shown in FIGURE 6, the pulley 76 is fixedly mounted on the shaft 72 as by a set screw 77. The chaine 12a and 12b of the conveyor 12 extend around respective sprockets 76a and 76b mounted on the shaft 72 on either side of the pulley 76. The sprockets 76a and 76b may be integral with the pulley 76. The sprockets 76a and 76b engage the links of the chains 12a and 12b to drive the conveyor 12 upon rotation of the shaft 72. The chains 12a and 12b also extend around respective sprockets 74a and 74b on either side of the pulley 74 (FIGURE 5). The sprockets 74a and 74b may be integral with the pulley 74.

A plurality of spools 78 (FIGURES 3 and 5) are affixed to the chains 12a and 12b at equally spaced intervals along the chains and are disposed with their axes substantially perpendicular to the chains. Each of the spools 78 has a plurality of annular rubber members 78a, 78b, 78c, and 78d (FIGURE 5) around its periphery. These annular members are spaced axially along each spool 78, with the outer members 78a and 78d having a somewhat larger diameter than the inner members 78b and 78c to conform to the contour of the specimens such as the eggs 16. As shown in FIGURE 3, the specimens such as the eggs 16 are supported on the conveyor 12 between successive pairs of the spools 78, and the rubber members 78a, 78b, 78c and 78d on each successive spool define a cradle for gently holding the eggs to prevent breakage.

A rotatable pin 80 is mounted in the housing 10 directly above the optical axis B (FIGURE 3). A hub member 81 (FIGURES 3 and 5) is mounted on the pin 80 and is provided with four radial arms, such as arms 81a, 81b, 81c and 81d. The four arms are at right angles to one another. These arms are engaged by the eggs 16 as the specimens are drawn through the housing 11 by the conveyor 12 so as to produce a rotation of the pin 80. Also mounted on the pin 80 and axially spaced from the hub member 81 is a second hub member 82 supporting four radial arms. As best seen in FIGURE 3, the radial arms are perpendicular to one another and are designated as 82a, 82b, 82c and 82d. The arms 82a to 82d, inclusive, of the member 82 have the same respective angular positions as the arms of the member 81.

At the end of each of the arms 82a to 82d, inclusive, is mounted a suitable shield 84 (FIGURE 3), which may be a yellow filter. As the member 82 is rotated, the shields 84 become successively disposed in front of the aperture 46. The shields become positioned in front of the aperture 46 whenever an egg 16 is moved away from the aperture by the conveyor 12 and before the next egg is moved to the aperture. In this way, excessive light from the source 40 is prevented from passing through the aperture 46 into the chassis 19. If the excessive light were not prevented from passing into the chassis 19, the light could overload and damage the photoelectric tubes 56 and 66.

As shown in FIGURE 4, a plurality of actuating members or dogs 90 are mounted on the chain 12a of the conveyor 12. Each actuating member 90 is pivotably attached to an extended link of the chain 12a in a position axially aligned with a corresponding one of the spools 78. This causes an actuating member 90 to be positioned between successive eggs 16 as the eggs are transported by the conveyor 12. Each actuating member 90 has a first finger 90a (FIGURES 9, 10 and 11) which extends in a rearward direction and projects beyond any other portion of the actuating member. The finger 90a has lip portion 90d at its outer end. Each actuating member also has a second finger 90b which is somewhat shorter than the finger 90a. The finger 90b extends rearwardly in a direction corresponding somewhat to the direction of the finger 90a and at a position to the right of the finger 90a in FIGURE 9. The finger 90b also has a lip portion 90e at its outer end. Each of the actuating members 90 is also provided with a flange portion 90c at the left end of the member in FIGURE 9. The flange portions 90c extend upwardly when seen from a position corresponding to that shown in FIGURE 9.

As the conveyor 12 is drawn around the table 11, the flange portion 90c of each of the actuating members 90 engages a wedge-shaped reset block 92 (FIGURE 4). The block 92 is mounted on the side wall of the housing 10 and is provided with a configuration which tapers downwardly toward the left in FIGURE 4. Because of the tapered configuration of the reset block 92, each actuating member 90 is pivoted by the block 92 in a clockwise direction so that the fingers 90a and 90b become disposed in a direction toward the right in FIGURES 4 and 9. That is, regardless of the previous angular position of the actuating members 90, the members are reset by the block 92 into one angular position just before reaching the test station.

As best shown in FIGURES 2 and 3, the motor 17 has a drive shaft 101 which drives a shaft 98 through a chain 99. The drive shaft 98 is rotatably mounted on the table 10 in parallel relationship to the shafts 72 and 101 and at substantially the same vertical level as the shaft 72. The chain 99 extends around a sprocket wheel 100 affixed to the shaft 101 and around a sprocket wheel 102 (see FIGURE 2) affixed to the shaft 98.

A pair of cams 104 and 106 are mounted on the shaft 98 for rotation with the shaft to operate switches 107 and 108 (FIGURE 6). The switches 107 and 108 are mounted on a bracket 109 affixed to the underside of the table 11. The switches 107 and 108 may be of spring-biased type so as to be held closed only while they are respectively engaged by the cams 104 and 106. "Microswitches" manufactured by the Minneapolis-Honeywell Corporation of Minneapolis, Minnesota, are well suited for this purpose. The action is such that switch 107 is closed for a first selected portion of each revolution of the shaft 98 and the switch 108 is closed for a second selected portion of each revolution of the shaft. As will be described in detail subsequently, the switch 108 is closed after the switch 107 and is subsequently opened at the same time as the switch 107.

A crank arm 110 (FIGURE 4) is fixedly mounted on the shaft 98 in front of the housing 10 (FIGURES 2 and 4). The crank 110 is coupled as by a pin 114 to one end of a connecting link 112 for pivotal movement relative to the link. The other end of the connecting link 112 is coupled as by a pin 116 to one end of an arm 117 for pivotal movement relative to the arm. The arm 117 is rotatably mounted at its bottom end. A ratchet wheel 120 is affixed to the shaft 72 as by a set screw 123 (FIGURE 6) and is provided with three teeth for reasons which will become more apparent subsequently. A pawl 122 is pivotally attached to the arm 117 and is urged into engagement with the ratchet wheel 120 as by a leaf spring 124 mounted on the side of the link.

The arrangement is such that continuous rotation of the shaft 98 by the motor 17 causes the crank 110 to rotate, as may be best seen in FIGURES 2 and 4. This in turn causes the pawl 122 to engage one of the teeth in the ratchet wheel 120 and to move the ratchet wheel through an angle of 120 degrees until the pressure of the pawl against the ratchet tooth becomes interrupted. There is then no further rotation of the shaft 72 until the shaft 98 has completed a revolution. After a revolution of the shaft 98, the pawl 122 engages the next tooth in the ratchet wheel 120 to rotate the shaft 72 through another angular distance of 120 degrees. In this way, the shaft 72 is rotated through an angle of 120° for each full revolution of the shaft 98 so as to receive an intermittent motion.

Since the movements of the conveyor 12 are controlled by the shaft 72, the conveyor moves intermittently. By intermittently driving the conveyor 12, each egg 16 is moved into position at the test station between the apertures 44 and 46 and is maintained in this position for a selected period of time until the pawl 122 again engages the ratchet wheel 120. Each egg 16 is held at rest at the test station for a period of time sufficient for the presence or absence of blood spots in the egg to be tested.

A solenoid 130 (FIGURE 7) is mounted on the underside of table 11 adjacent the test station. As will be described in detail subsequently, the solenoid 130 is energized whenever a specimen such as an egg 16 at the test station is detected as having foreign matter such as a blood spot. A bell crank lever 132 is pivotally attached near the end of one leg as by a pin 134 to a bracket 133 which is mounted on the table 11. At the same end, the bell crank lever 132 has a bifurcated portion which engages a pin 136 on the armature 137 of the solenoid 130. The other end of the bell crank lever 132 is also bifurcated so as to engage a pin 138 on a bar 139. The bar 139 is slidably mounted on the table 11 for reciprocal motion in a forward and rearward direction across and under the conveyor 12. In this way, when the solenoid 130 is energized, it actuates the armature 137 upwardly in FIGURE 7 so as to move the bar 139 toward the right in the direction of the arrow in FIGURE 7.

A block 140 is attached to the end of the bar 139 remote from the bell crank lever 132 and at a position near the chain 12a of the conveyor 12. When the solenoid 130 is energized to move the bar 139 in the direction of the arrow in FIGURE 7, the block 140 is moved into the path of flange portion 90c of an actuating member 90. This action is shown in FIGURES 9 to 11, inclusive. The actuating member 90 of FIGURE 9 was previously reset by the block 92 (FIGURE 4) so that its arm 90a would extend in a direction substantially parallel to movement of the conveyor 12.

When the solenoid 130 is subsequently energized to indicate foreign matter in the egg at the test station, the block 140 moves forward into the path of the actuating member. The movement of the conveyor 12 toward the right in FIGURES 3 and 4 causes the flange portion 90c of the actuating member 90 to engage the side of the block 140 for a pivotal movement of the actuating member in a counter clockwise direction (FIGURE 10). This pivotal movement of the member 90 continues until the finger 90a extends in a direction substantially perpendicular to the movement of the conveyor 12 (FIGURE 11). Subsequent movement of the conveyor 12 toward the right in FIGURES 3 and 4 causes the flange portion 90c of the actuating member 90 to engage an inclined cam surface 140b of the block 140 (FIGURES 8 and 12) so as to return the block to its original position. This causes the arm 139 to move in the direction opposite to that shown by the arrow in FIGURE 7 and causes the armature 137 to be withdrawn from the solenoid 130. In this way, the solenoid 130 and its associated members become prepared for operation when the next egg is being tested.

FIGURES 13 to 16, inclusive, show details of discriminating mechanism for controlling the movement of the eggs either to the first receiving station (pan 27) or to the second receiving station (pan 28). The discriminating mechanism is actuated to move the eggs to the pan 27 or the pan 28 in accordance with the presence or absence of blood spots in the eggs. As shown in FIGURES 15 and 16, the track section 22a has a base portion 22b which extends under the guide track 24. The base portion 22b has at each end an ear 230 (also shown in FIGURE 3), which is pivotably attached as by a pin 232 to a bracket 231 affixed to the table 11. In its normal position, the guide track 22a extends above the guide tracks 24 and 26 so as to direct the eggs over the guide tracks 24 and 26 and into the pan 27 (FIGURE 1). The guide track 22a is pivotable to a lower position (shown in FIGURE 15) such that the eggs become engaged by the guide tracks 24 and 26 and become directed into the pan 28.

A shaft 156 (FIGURE 14) is mounted on the table 11 below and substantially parallel to the conveyor drive shaft 72. A yoke 152 is pivotably mounted on the shaft 156 and is provided with a cross piece 152a and a leg 152b extending outwardly from the cross piece 152a in the direction of the track sections 20 and 22. A helical spring 150 is attached at opposite ends to the table 11 and the leg 152b to bias the yoke in a counterclockwise direction in FIGURE 14. The yoke also has an integral arm 152c extending upwardly from the cross piece. The arm 152c has an arcuate surface facing the path of the actuating members 90 as the members are drawn around the sprocket 76a.

As previously described, certain of the actuating members 90 are not pivoted so as to remain in the position representing eggs without blood spots. When the actuating members 90 are not pivoted, the arms 90a on the members extend parallel to the direction of motion of the conveyor 12 and do not engage the arm 152c of the yoke 152. Since these actuating members 90 do not engage the yoke 152, the leg 152b of the yoke and the track section 22a remain in their upper positions under the bias of the spring 150. This causes all eggs not having blood spots to be directed to the pan 27 by the tracks 20 and 22.

Figure 14:
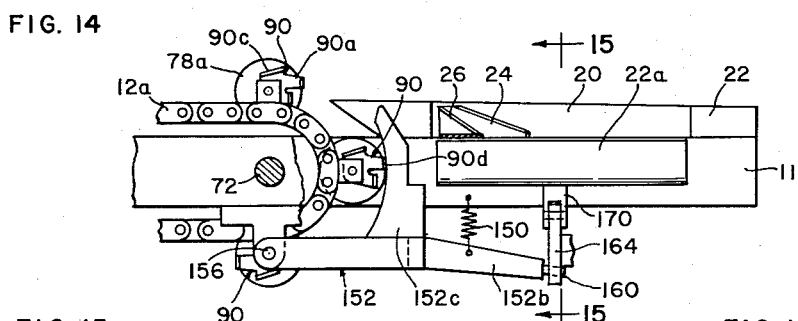
FIGURE 14 is a fragmentary front elevational view of the end of the apparatus of FIGURE 13 and illustrates the cooperative relationship between an actuating member pivoted as shown in FIGURE 11, and the discriminating mechanism shown in FIGURE 13 when an egg containing blood is to be directed to the second receiving station.

When an egg has a blood spot, the solenoid 130 becomes energized through electrical circuitry which will be described in detail subsequently. This causes one of the actuating members 90 to be pivoted in a manner similar to that shown in FIGURES 9 to 11, inclusive, and described fully above. Because of the pivotal movement imparted to the actuating member 90, the arm 90a in the member is disposed in a direction perpendicular to the direction of travel of the conveyor 12. This causes the arm 90a to engage the arcuate surface of the arm 152c as shown in FIGURE 14 such that the yoke 152 becomes rocked about the shaft 156 in a clockwise direction. When the yoke 152 becomes rocked, the leg 152b moves to its lower position against the bias of the spring 150. The leg 152b is held at its lower position by the actuating member 90 until the actuating member has completely traversed the arcuate surface of the arm 152c.

A stud 160 extends outwardly from the free end of the leg 152b in a direction corresponding substantially to the longitudinal axis of the leg. The stud 160 passes through an elongated slot 161 which is provided in the bottom rear corner of a triangular member 164. At a second corner, the member 164 is pivotably coupled as by a pin 168 to a bracket 166 which is secured to the table 11. At the third corner, the member 164 is pivotably coupled as by a pin 172 to one end of a link 170. The other end of the link 170 is in turn pivotably coupled as by a pin 180 to a lug 178 extending downwardly from the base portion 22b of the track section 22.

Upon an engagement between one of the pivoted actuating members 90 and the arcuate surface of the arm 152c, the leg 152b of the yoke 152 is moved downwardly against the bias of the spring 150. Since the member 164 is coupled to the leg 152b through the pin 160, the member 164 becomes pivoted in a clockwise direction from the position shown in FIGURE 16 to the position shown in FIGURE 15. In the position of the member 164 shown in FIGURE 15, the track section 22a is disposed so that the specimen can be directed to the pan 28, which serves as the station for receiving the eggs with blood spots. This causes the eggs with blood spots to become separated from the eggs without blood spots since the eggs without blood spots are directed to the pan 27 as described above.

The electrical circuitry forming a part of the apparatus is shown in FIGURE 17. This circuit includes the photoelectric tubes 56 and 66 shown mechanically in FIGURE 2. The tubes 56 and 66 may be of the photomultiplier type. For example, the photoelectric tube 56 may be provided with an anode 300 and a cathode 302. A plurality of dynodes are positioned in such manner as to achieve electrostatic focusing of photoelectrons and secondary emission electrons. The plurality of dynodes are schematically represented in FIGURE 17 in tubes 56 and 66. A plurality of resistors 306 are connected between successive pairs of dynodes in the tube 56 and a resistor 306j is connected between the dynode 304j and the cathode 302.

The photoelectric tube 66 may be similar in its construction to the photoelectric tube 56. The tube 66 has an anode 310, a cathode 312 and a plurality of dynodes such as a dynode 313a and a dynode 313j. Resistors 314 interconnect successive pairs of the dynodes in the photoelectric tube 66 and a resistor 314j interconnects the dynode 313j and the cathode 312 in the tube 66. Since the actual construction of photoelectric tubes similar to the tubes 56 and 66 is well known, a further description of the mechanical details of these devices is believed to be unnecessary.

The anode of the tube 56 is connected to one terminal of a resistor 320 having its other terminal grounded, and the anode 310 of the tube 66 is connected to one terminal of a resistor 321 having its other terminal grounded. The dynode 304a of the tube 56 is connected in series with a resistor 322, a potentiometer 323, a resistor 324 and the dynode 313a of the tube 66. The potentiometer 323 has a movable arm which is grounded.

The anode 310 of the photoelectric tube 66 is coupled through a capacitor 326 to the control grid of a tube 328. The anode of the tube 328 receives a positive voltage from a line which is labeled B+ and which is connected to the positive terminal of a power supply in a manner to be described. A pair of resistors 330 and 331 are connected between the B+ line and ground so as to establish their common terminal 329 at a reduced positive potential with respect to ground. The control grid of the tube 328 is connected to the terminal 329 through a resistor 332. The cathode of the tube 328 is connected to one terminal of a resistor 334 having its other terminal grounded.

The anode 300 of the photoelectric tube 56 is coupled through a capacitor 335 to the control grid of a tube 337 which may be included in the same envelope with the tube 328, as shown in the drawings. The control grid of the tube 337 is connected to the terminal 329 through a resistor 341. The anode of the tube 337 is connected to the line B+, and the cathode of the tube is connected to one terminal of a resistor 340 having its other terminal grounded. The tubes 328 and 337 are included in cathode follower stages to prevent excessive loading of the photoelectric tubes 56 and 66.

The cathode of the tube 328 has a common connection with one terminal of a winding 345 forming a part of a transformer 346. The cathode of the tube 337 is connected to the other terminal of the primary winding 345. Because of these connections, no current flows through the primary winding 345 so long as the voltage drop across the cathode resistor 334 equals the voltage drop across the cathode resistor 340. The secondary winding 347 of the transformer 346 is shunted by a capacitor 348 and is grounded at one terminal. The other terminal of the secondary winding 347 is connected to the control grid of a tube 350. The cathode and the suppressor grid of the tube 350 are connected to one terminal of a resistor 352 having its other terminal grounded. The anode of the tube 350 receives a positive potential through a resistor 354 from the B+ line. The tube 350 includes a screen grid which has a positive potential applied to it through a resistor 356 from the B+ line and which is by-passed to ground through a capacitor 357.

The anode of the tube 350 is coupled through a coupling capacitor 360 to the control grid of a gaseous discharge tube 362 commonly known as a thyratron. The anode of the tube 362 is connected to one terminal of a relay winding 366 which is in parallel with a capacitor 369. Second terminals of the relay 366 and the capacitor 369 have common terminals with the movable arm 107a of the switch 107 (the switch 107 being also shown in FIGURE 6). The movable arm 107a of the switch 107 is movable from a stationary contact 107b to a stationary contact 107c against the action of a spring (not shown) when the arm is actuated by the cam 104 in FIGURE 6. The contact 107c is connected to a line 368 and no electrical connection is made to the contact 107b of the switch.

The cathode of the tube 362 is connected to one terminal of a resistor 364, the other terminal of which is grounded. The control grid of the tube 362 is connected to one terminal of a resistor 374, the other terminal of which is connected to the movable arm of a potentiometer 371. One stationary contact of the potentiometer 371 is grounded. A resistor 372 is connected between the other stationary contact of the potentiometer 371 and the B+ line. The resistor 372 and the potentiometer 371 are connected as a voltage-dividing network between the B+ line and ground so that a positive bias is impressed on the grid of the tube 362. This bias is adjustable by variations in the positioning of the movable arm in the potentiometer 371.

The control circuit shown in FIGURE 17 includes a power supply formed in part by a power transformer 380. The input terminals 382 of the power supply may be connected to any suitable source of alternating current such as a wall outlet commonly found in homes and industrial and commercial establishments. The terminals 382 are also connected to a pair of power lines 381. The lower line 381 in FIGURE 17 is connected to one of the input terminals of a voltage regulator 383 of conventional construction. The upper lead 381 in FIGURE 17 is connected through a fuse 384 to a movable arm 385 in the switch 35 (also shown in FIGURE 1). The movable arm 385 is pivotable to "off" position, "stand-by" and "on" positions. In the "off" position, the arm 385 engages a contact having no electrical connections. In both of the tacts which are connected to the second input terminal of the voltage regulator 383.

One of the output terminals of the voltage regulator 383 is connected to a movable arm 387 in the switch 35, and the other output terminal of the voltage regulator is connected to a movable arm 388 in the switch. The movable arms 387 and 388 are pivotable to an "off" position in which they engage contacts having no electrical connections. The movable arms 387 and 388 are also pivotable to "stand-by" and "on" positions. In the "stand-by" and "on" positions, the arm 387 engages contacts which are electrically connected to one terminal of a primary winding 390 forming a part of the power transformer 380. In the "stand-by" and "on" positions, the arm 388 engages contacts which are electrically connected to the other terminal of the primary winding 390.

A step-down transformer 392 has a primary winding 391 connected between the lower power line 381 in FIGURE 17 and the "stand-by" and "on" contacts associated with the movable arm 385 of the switch 35. The secondary winding 393 of the transformer 392 is connected to the lamp 40 (FIGURE 2). When energized, the lamp 40 serves to illuminate the specimen egg with radiant energy.

The energizing coil 130a of the solenoid 130 (see FIGURE 7) is in parallel with the lamp 38 (also shown in FIGURE 1), this coil being included within the casing of the solenoid 130 illustrated in FIGURE 7. One terminal of the energizing coil 130a is also connected to a contact 108c in the cam-operated switch 108 (also shown in FIGURE 6). This switch includes a movable arm 108a which is spring biased against a contact 108b and is movable by the cam 106 into engagement with the contact 108c. The movable arm 108a is electrically connected to the lower power line 381 in FIGURE 17. The energizing coil 130a of the solenoid 130 is connected at the other terminal to a contact 366a which is included in a switch associated with the relay coil 366. An arm 366b associated with relay coil 366 is connected to the "stand-by" and "on" contacts which are adapted to be engaged by the arm 385 in the switch 35.

The secondary winding 380a of the transformer 380 is connected to the indicator lamp 36 mounted in the chassis 30 (FIGURE 1). When illuminated, the lamp 36 indicates that power is being supplied to the equipment. The transformer 380 also has a secondary winding 400 which is center-tapped to ground. The opposite terminals of the winding 400 are connected respectively to the anodes of a full-wave rectifying tube 406. The cathode of the tube 406 is connected through a resistor 408 to a movable arm 410 included in the multiple switch 35. Capacitors 412 and 414 are connected between opposite terminals of the resistance 408 and ground. A resistor 416 is in parallel with the capacitor 414 and is in series with a resistor 418 having one terminal connected to a "stand-by" contact. The "stand-by" contact is adapted to be engaged by the arm 410, as are an "on" contact and an "off" contact. The "on" contact receives positive voltage from the B+ line and the "off" contact has no electrical connection.

The movable arm 387 of the switch 35 is electrically connected to a movable arm 420 of that switch. The movable arm 420 is adapted to engage "off" and "stand-by" contacts to which no electrical connections are made. The movable arm 420 is also adapted to engage an "on" contact which is electrically connected to one terminal of a primary winding 422 included in a transformer 423. The other terminal of primary winding 422 is connected to the "stand-by" and "on" contacts associated with the movable arm 388. Therefore, alternating voltage is applied to the primary winding 422 of the transformer 423 only when the switch 35 is moved to its "on" position. The secondary winding 424 of the transformer 423 has one terminal connected to the cathodes of the photoelectric tubes 56 and 66. The other terminal of the secondary winding 424 has a common connection with one terminal of a resistor 426, the other terminal of which is connected to the anode of a tube 428. The cathode of the tube 428 is grounded, and the grid of the tube is connected to first terminals of a resistor 434 and a capacitor 436. The other terminals of the resistor 434 and the capacitor 436 are grounded.

The cathode of the tube 328 is connected to the cathode of a diode 440. The plate of the diode 440 has common connections with one terminal of a coupling capacitor 442 and with one terminal of a resistance 451. The other terminal of the resistance 451 has a common connection with a pair of resistances 452 and 454 connected in series between the B+ line and ground. The other terminal of the capacitor 442 has a common connection with the control grid of a tube 446. The control grid and cathode of the tube 446 are respectively connected to first terminals of resistors 448 and 450 the second terminals of which are grounded.

The anode of the tube 446 is connected through a load resistor 458 to the B+ line and is coupled through a capacitor 460 to a control grid of a tube 463. As shown in FIGURE 17, the tube 463 may be included in the same envelope with the tube 446. The cathode and control grid of the tube 463 are respectively connected to first terminals of resistors 466 and 468 having their second terminals grounded. The anode of the tube 463 is adapted to receive positive voltage through a load resistor 472 from the B+ line and is coupled through a capacitor 474 to the control grid of the tube 428.

As noted previously, the contact 107c of the switch 107 is connected to the lead 368. The lead 368 is in turn connected to the center contact *b* associated with a movable arm 451 in the switch 37. The movable arm 451 is adapted to be manually pivoted to contacts *a*, *b* and *c*. The arm 451 is connected to the upper terminal of the secondary winding 400 in FIGURE 1. No electrical connections are made to the *a* and *c* contacts associated with the arm 451.

A movable arm 453 is included in the switch 37 and is ganged to the arm 451 so as to engage contacts *a*, *b* and *c*. The contact *a* associated with the movable arm 453 is connected to one terminal of a resistor 455 having its other terminal connected to the movable contact of the potentiometer 371. The contact *b* associated with the arm 453 has no electrical connections. The movable arm 453 is connected to the cathode of a diode 482 and to one terminal of a resistor 461, the other terminal of which is connected to a first terminal of a meter 480. The other terminal of the meter 480 and the plate of the diode 482 are grounded. The *c* contact associated with the arm 453 is coupled through a series capacitor 457 to the cathode of a tube 460 forming a part of a cathode follower stage.

The anode of the tube 460 receives voltage from the B+ line, and the cathode of the tube has a common connection with one terminal of a resistor 467, the other terminal of which is grounded. The control grid of the tube 460 is connected to an arm 471 mechanically ganged to the arms 451 and 453. The arm 471 is adapted to engage contacts *a*, *b* and *c* in its different pivotal positions. The *a* and *b* contacts associated with the arm 471 are grounded and the *c* contact is connected to the control grid of the tube 362.

The following values have been used in a constructed embodiment of the invention. These values are listed below only by way of example and are not intended to limit the invention in any way:

| | |
|---|---|
| Photoelectric tube 56 | RCA 6328. |
| Photoelectric tube 66 | RCA 6328. |
| Resistors 306 and 306j | 62 kilo-ohms (each). |
| Resistors 314 and 314j | |
| Resistor 322 | 27 kilo-ohms. |
| Resistor 324 | 27 kilo-ohms. |
| Resistor 325 | 100 kilo-ohms. |
| Resistor 332 | 1 megohm. |
| Resistor 341 | 1 megohm. |
| Capacitor 326 | .1 microfarad (200 volts). |
| Capacitor 335 | .1 microfarad (200 volts). |
| Resistor 330 | 100 kilo-ohms. |
| Resistor 331 | 30 kilo-ohms. |
| Tubes 328 and 337 | 12 AX7. |
| Resistor 334 | 30 kilo-ohms. |
| Resistor 340 | 30 kilo-ohms. |
| Capacitor 348 | .15 microfarads. |
| Tube 350 | 6AU6. |
| Resistor 352 | 2 kilo-ohms. |
| Resistor 354 | 470 kilo-ohms. |
| Resistor 356 | 1.2 megohms. |
| Capacitor 357 | 4 microfarads (250 volts). |
| Capacitor 360 | .03 microfarad. |
| Resistor 374 | 470 kilo-ohms. |
| Gaseous discharge tube 362 | 2D21. |
| Resistor 364 | 4.3 kilo-ohms. |
| Resistor 371 | 2.5 megohms. |
| Resistor 372 | 100 kilo-ohms. |
| Meter 480 | 0–100 micro-amperes. |
| Diode 482 | 1N67. |
| Resistor 455 | 1 kilo-ohm. |
| Resistor 461 | 51 kilo-ohms. |
| Capacitor 457 | 0.1 microfarad. |
| Tube 460 | 6C4. |
| Diode 440 | HD6001. |
| Resistor 452 | 1200 kilo-ohms. |
| Resistor 454 | 1 kilo-ohm. |
| Capacitor 442 | 1 microfarad. |
| Resistor 448 | 1 megohm. |
| Resistor 450 | 20 kilo-ohms. |
| Resistor 466 | 20 kilo-ohms. |
| Resistor 468 | 1 megohm. |
| Capacitor 460 | .1 microfarad. |
| Resistor 458 | 68 kilo-ohms. |
| Resistor 472 | 100 kilo-ohms. |
| Capacitor 474 | .1 microfarad. |
| Resistor 434 | 1 megohm. |
| Capacitor 436 | 0.2 microfarad. |
| Resistor 426 | 82 kilo-ohms. |
| Tube 463 | 12AT7. |
| Tube 428 | 6S4. |
| Tube 406 | 6X4. |
| Capacitor 412 | 20 microfarads. |
| Resistor 418 | 3 kilo-ohms. |
| Capacitor 414 | 20 microfarads. |
| Resistor 416 | 125 kilo-ohms (10 watts). |
| Resistor 418 | 25 kilo-ohms (10 watts). |

In the "off" position of the switch 35, no voltage is introduced to any of the electrical components shown in FIGURE 17 even when the input terminals 382 are connected to a suitable source of alternating voltage. Upon an actuation of the switch 35 to the "stand-by" position, the unregulated alternating voltages across the power leads 381 is introduced through the arm 385 to the input terminals of the voltage regulator 383. The regulated voltage from the regulator 383 is introduced through the arms 387 and 388 to the primary winding 390 of the power transformer 380. Voltage is then induced in the secondary winding 450 of the power transformer 380, causing the indicator lamp 36 to be illuminated. The indicator 36 remains lighted when the switch 35 is turned to its "on" position to show that electrical energy is being impressed on the system. The unregulated alternating voltage across the power leads 381 is also applied through the arm 385 in the switch 35 to the primary winding 391 of the transformer 392. This causes the lamp 40 to become illuminated.

When the switch 35 is in its "stand-by" position, no alternating voltage is applied to the primary winding 422 of the transformer 423 so as to prevent potential from being applied to such components as the photoelectric tubes 56 and 66. However, the filaments of the various tubes of the system are heated when switch 35 is pivoted to its "stand-by" position. The filaments may be heated by power from the secondary winding 380a forming a part of the transformer 380.

Since alternating voltage is introduced to the primary winding 390 in the "stand-by" and "on" positions, an alternating voltage is introduced to the plates of the tube 406. In the alternate half-cycles of voltage, a positive potential is impressed on the upper anode of the tube 406 in FIGURE 17. This causes current to flow through the upper half of the secondary winding 400 in FIGURE 17, the upper anode and the cathode of the tube 406 and the capacitance 412. This current charges the capacitance 412 to produce a positive potential on the ungrounded terminal of the capacitance.

In the other half cycles of the alternating voltage, current flows through a circuit including the lower half of the winding 400 in FIGURE 17, the lower anode and the cathode of the tube 406 and the capacitor 412. As will be seen, this current also charges the capacitor 412 to produce a positive voltage on the ungrounded terminal of the capacitor. Since the capacitor 412 becomes charged only to a positive polarity, a direct voltage of positive polarity is produced across the capacitor. This direct voltage is further smoothed and filtered by the action of the resistor 408 and the capacitor 414. In the "on" position of the switch 35, the positive voltage across the capacitor 414 is introduced through the arm 410 to the B+ line.

In the "on" position of the switch 35, positive biases are applied from the B+ line to the control grid of the tube 328 through the resistances 330 and 332 and to the control grid of the tube 337 through the resistances 330 and 341. These positive biases cause the tubes 328 and 337 to be normally conductive. The current flowing through the tube 328 is normally equal to the current flowing through the tube 337 because of the similar characteristics of the tubes and the substantially equal values of the resistances 332 and 341. As long as the current flowing through the tube 328 is equal to the current flowing through the tube 337, the positive voltages produced across the cathode resistors 334 and 340 are equal. Because of the equal voltages across the resistances 334 and 340, no current flows through the primary winding 345 of the transformer 346. For this reason, no voltage is induced in the secondary winding 347 of this transformer.

When the switch 35 is moved to its "on" position, the B+ line becomes connected to the resistor 416 at the output of the power supply to receive direct voltage. The primary winding 422 of the transformer 423 is also energized when the switch 35 is in its "on" position. The primary winding 422 is energized through a circuit including the voltage regulator 383 and the arms 388 and 420 in the switch 35. This causes alternating voltage to be induced in the secondary winding 424 and to be applied from the winding to such components as the photoelectric tubes 56 and 66. In this way, the apparatus constituting this invention becomes operative only in the "on" position of the switch 35.

When the arm 107a of the switch 107 is driven by the cam 104 (FIGURE 6) into engagement with the contact 107c, the alternating voltage across the top half of the secondary winding 400 in FIGURE 17 is introduced through the switch 107 and through the relay winding 366 to the anode of the gaseous discharge tube 362. The movable arm of the rheostat 371 is adjustably positioned to apply a positive bias of a particular magnitude on the grid of the gaseous discharge tube 362. This positive bias is at a sufficiently high level to produce a flow of current through the tube for each positive half-cycle of the alternating voltage impressed on the anode of the tube when no signal is applied to the control grid of the tube. This causes the relay 366 to become energized in the positive half cycles of voltage from the top half of secondary winding 400.

Upon the triggering of the tube 362 to a state of conductivity in the positive half cycles of voltage, current flows through a circuit including the tube and the capacitor 369 and charges the capacitor. The tube 362 becomes cut off in the negative half cycles of alternating voltage since a negative voltage is applied from the secondary winding 400 to the anode of the tube. During the negative half cycles of voltage, the capacitor 369 discharges through the relay winding 366. Because of this discharge, current flows through the relay winding 366 to energize the relay during the time that the tube 362 is conductive and the switch 107 is closed.

Any differences in the characteristics of the photoelectric tubes 56 and 66 may be balanced by adjusting the movable arm of the potentiometer 323. This adjustment is made so that light of equal intensities on the photoelectric tubes 56 and 66 will produce signals of equal amplitudes across the resistors 320 and 321. This balancing effect is achieved by simultaneously adjusting in one direction the resistance between the dynode 304a of the tube 56 and ground and adjusting in an opposite direction the resistance between the dynode 313a of the tube 66 and ground.

To make an initial adjustment of the system, the motor 17 in FIGURE 1 is energized to set the conveyor 12 in motion and to open and close the switches 107 and 108 (FIGURES 6 and 17) in a logical sequence. The switch 35 is set to its "stand-by" position until various members such as the photoelectric and vacuum tubes of the system have reached their operating temperature. The switch 35 is then set to its "on" position. Each revolution of the shaft 98 by the motor 17 causes the cam 104 (FIGURE 6) to move the arm 107a at a time corresponding to the positioning of an egg at the test station. The cam 104 holds the arm 107a of the switch 107 against the contact 107c for a particular interval of time such as an interval in the order of 100 milliseconds. The alternating potential from the secondary winding 400 is applied to the anode of the gaseous discharge tube 362 only when the arm 107a of the switch 107 engages the contact 107c. This causes the operation of the cam 104 to be synchronized with the movement of the conveyor 12 such that the solenoid winding 130a can become energized only when an egg is actually in position at the test station.

The cam 106 (FIGURE 6) moves the arm 108a against the contact 108c of the switch 108 in FIGURE 17 at a suitable time such as 30 milliseconds after the closure of the switch 107. When the arm 108a engages the contact 108c, the solenoid winding 130a becomes energized if the arm 366b of the relay 366 is engaging the relay contact 366a. As will be seen, the arm 366 engages the contact 366a only when current does not flow through the relay 366 and the tube 362. By providing for the closure of the switch 108 approximately 30 milliseconds after the closure of the switch 107, ample time is given for the actuation of the relay 366 so that the solenoid circuit will be broken between contacts 366a and 366b, provided that the tube 362 is conducting.

Each time that the solenoid winding 130a is energized, the solenoid 130 acts to pivot an actuating member 90 as described previously. The solenoid winding 130a remains energized for a particular period of time such as 70 milliseconds so that a positive action can be exerted to pivot the actuating member 90. A visual indication is provided every time that the solenoid winding 130a becomes energized since the lamps 38 are in parallel with the winding. This indication visually shows that the egg undergoing test has a blood spot.

The operation of the apparatus providing a discrimination between eggs having blood spots and eggs not having blood spots is as follows:

The eggs 16 are placed upon the trough 14 so as to roll down the trough to the conveyor 12. Breakage is prevented by the rubber rings 73 and 75 (FIGURE 5) on the pulleys 74 at the entrance to the conveyor. The motor 17 imparts an intermittent drive to the conveyor in a manner previously described so as to move the spools 78 up and around the pulleys 74. As the successive spools 78 move up and around the pulleys 74, they cause the eggs 16 to move one at a time from the trough 14 to the conveyor 12. The eggs are supported on the conveyor between successive spools 78 by the annular rubber rings 78a to 78d, inclusive, on the spools.

The eggs 16 are then transported by the conveyor to the test station between the apertures 44 and 46. The movement of each egg is arrested for a certain time interval at the test station because of the intermittent drive imparted to the conveyor. While the movement of each egg is arrested, the arm 107a is moved by the cam 104 (FIGURE 6) into engagement with the contact 107c for approximately 100 milliseconds. Thirty milliseconds later, the arm 108a is moved into engagement with the contact 108c. After 70 more milliseconds, the arms 107b and 108a are respectively returned into engagement with the contacts 107b and 108b.

As previously noted, the photoelectric tube 66 produces a signal having an amplitude dependent upon the average amount of light incident on its cathode at and near the wavelengths of approximately 555 and 595 millimicrons. This signal is produced at the anode of the tube 66 so as to appear across the resistor 321. Similarly, a signal is produced at the anode of the photoelectric tube 56 so as to appear across the resistor 320. This signal has an amplitude dependent upon the intensity of the light incident on the cathode of the tube 56 at and near the wavelength of 575 millimicrons.

As is well-known, the signal produced at the anode of either of the photoelectric tubes 56 or 66 is amplified in the tube. This amplification results from the action of the successive dynodes within each tube in multiplying the number of electrons passing to the successive dynodes in the tube. For example, the light from the lens 54 (FIGURE 2) is directed toward the cathode of the photoelectric tube 56 and is instrumental in producing an emission of electrons from the cathode. These electrons are attracted to the adjacent dynode 304j whenever the cathode is driven negative with respect to that dynode. This occurs for each negative half-cycle of the alternating voltage across the secondary winding 424 of the transformer 423.

The electrons attracted by the positive potential on the dynode 304j relative to the potential on the cathode 302 strike this dynode with sufficient force to produce a multiplied secondary emission of electrons. In like manner, successive dynodes in the tube 56 multiply the electron flow so that the electron stream received at the anode of the tube 56 is considerably greater than the electron stream initially emitted by the cathode of the tube. This results in the flow of an amplified current through the resistor 320 and the production of an amplified signal across the resistor. The signal produced across the resistor 321 is also amplified in a similar manner by the action of the photoelectric tube 66.

Whenever an egg 16 having no blood spot is positioned at the test station, the average amount of light incident on the photoelectric tube 56 is substantially equal to the average amount of light incident on the photoelectric tube 66. This has been described in detail previously. The movable arm on the potentiometer 323 has previously been adjusted so that the signal across the resistor 320 substantially equals the signal across resistor 321 when an egg having no blood spot is being tested. Each of these signals is in the form of a series of negative pulses occurring at the same frequency as the alternating voltage impressed on the photoelectric tubes and having a duration corresponding to the length of time at which the egg is positioned at the test station by the conveyor 12.

The negative pulses of equal amplitude produced across the resistors 320 and 321 for an egg having no blood spot are respectively applied to the control grids of the tubes 337 and 328. These negative pulses produce a decrease in the flow of current through the tubes 328 and 337 and a corresponding decrease in the positive voltages across the cathode resistors 334 and 340. This means that the positive voltage produced across the resistor 334 still equals the positive voltage produced across the resistor 340. Because of this balanced condition, no current flows through the primary winding 345 of the transformer 346 and no signal appears across the secondary winding 347 of the transformer. This causes the current flowing through the tube 350 to remain substantially constant and prevents any signal from passing through the coupling capacitance 360 to the control grid of the tube 362.

Coincident with the positioning of the egg at the test station, the cam 104 (FIGURE 6) moves the arm 107a of the switch 107 into engagement with the contact 107c. This causes alternating voltage to be introduced from the upper half of the secondary winding 400 in FIGURE 17 through the relay winding 366 to the anode of the tube 362. In the positive half cycles of the alternating voltage, the tube 362 becomes conductive since no signal is impressed on the control grid of the tube. When the tube 362 becomes conductive, the relay coil 366 becomes energized so as to actuate the arm 366b into engagement with the contact 366c.

Upon an engagement between the arm 366b and the contact 366c, an open circuit is established to prevent the solenoid winding 130 from being energized and the armature 137 in the solenoid from being actuated. This is the desired result for an egg having no blood spot since it causes the egg to roll into the pan 27. At the termination of the test cycle of the egg 16 undergoing test, the arms 107a and 108a of the switches 107 and 108 are simultaneously actuated by their respective cams into engagement with the contacts 107b and 108b.

The next egg 16 is subsequently moved to the testing position by the conveyor 12. When this occurs, the arm 107a of the switch 107 is actuated into engagement with the contact 107c. It will be assumed that the second egg has a blood spot. For an egg having a blood spot, the average intensity of light incident upon the tube 66 remains substantially the same as for an egg not having a blood spot but the intensity of light incident on the tube 56 decreases. Because of this, the amplitude of the negative signal produced across the resistor 320 becomes less than the amplitude of the negative signal produced across the resistor 321. This causes unequal currents to flow through the tubes 328 and 337 such that the amplitude of the positive voltage produced across the cathode resistor 334 becomes less than the amplitude of the positive voltage produced across the cathode resistor 340. This in turn produces a flow of current through the primary winding 345 of the transformer 346. Upon a flow of current in the primary winding 345, an alternating signal is induced in the secondary winding 347. The alternating signal induced in the secondary winding 347 has a negative polarity to conform with the polarity of the signal introduced to the primary winding 345.

The alternating signal induced in the secondary winding 347 is impressed on the control grid of the tube 350 and is amplified and inverted in phase by that tube. This causes the signal produced on the plate of the tube 350 to have a positive polarity. The positive signal produced on the plate of the tube 350 is in the form of several positive pulses occurring at the same frequency as the alternating voltage which is applied to the photoelectric tubes 56 and 66. As previously described, the alternating voltage may be at a suitable frequency such as 60 cycles per second.

During the time that positive pulses are produced on the plate of the tube 350, the capacitance 360 becomes charged to a positive value. The capacitance 360 becomes charged through a circuit including the B+ line, the resistance 354, the capacitance 360, the resistance 374 and the potentiometer 371. The resultant voltage produced across the capacitance 360 by the flow of charging current is introduced to the grid of the thyratron tube 362 to insure the flow of current through the tube.

After the production of the positive pulses on the plate of the tube 350, the tube 350 again becomes conductive. This causes the capacitance 360 to discharge through a circuit including the capacitance, the tube 350, the resistance 352, the potentiometer 371 and the resistance 374. Because of the discharge current flowing through the potentiometer 371 and the resistance 374, a negative voltage is produced on the grid of the tube 362 to cut off the tube. The negative voltage is produced on the grid of the tube 362 at the time that a positive voltage is being introduced to the plate of the tube.

Since current cannot flow through the tube 362 even in the positive half cycles of alternating voltage, the relay winding 366 cannot become energized. This causes the arm 366b to remain in engagement with the contact 366a such that a continuous circuit through the solenoid winding 130a is established. The flow of current through the solenoid winding 130a causes the actuating member 90 (see FIGURES 9–12) to become pivoted from the position shown in FIGURE 9 to the position shown in FIGURE 11, as described in detail previously. In this way, the actuating member 90 acts upon the members shown in FIGURE 16 to pivot these members into the position shown in FIGURE 15 so as to obtain a movement of the egg to the pan 28.

As previously noted, the cathodes of the photoelectric tubes 56 and 66, when energized, emit electrons each time that they are driven negative by the voltage induced in the secondary winding 424 of the transformer 423. The extent to which these cathodes are driven negative is automatically adjusted by the regulator circuit including the tubes 446, 463 and 428. This causes the current through the photoelectric tubes 56 and 66 to be limited to a safe value and prevents the tubes from being overloaded and possibly damaged.

The regulator circuit is under the control of the output signal from the photoelectric tube 66 since that tube produces a maximum signal for all specimens whether they contain foreign matter or not. When the amplitude of the output pulse produced by the tube 66 across the resistor 321 is less than a particular value such as 20 volts, the positive voltage produced across the cathode resistor 334 of the tube 328 becomes reduced from a value such as 50 volts to a value which is still greater than 30 volts. This potential is introduced to the cathode of the diode 440. The anode of the diode 440 is biased at a positive potential of approximately 30 volts by application of a positive potential through the resistor 451 to the voltage divider composed of resistances 452 and 454.

Since the positive potential on the cathode of the diode 440 is greater than the positive potential on the anode of the diode, no signal can be introduced to the grid of the tube 446 to vary the flow of current through the tube. The tubes 463 and 428 also continue in substantially constant states of operation to maintain substantially constant the amplitude of the alternating voltage introduced to the cathodes of the tubes 56 and 66 from the secondary winding 424.

When a negative signal exceeding 20 volts is produced across the resistor 321, the positive voltage produced across the cathode resistor 334 drops below the potential of 30 volts applied to the plate of the diode 440. This causes the potential on the plate of the diode 440 to drop below 30 volts and a negative pulse to be introduced to the control grid of the tube 446. The tube 446 operates to amplify and invert the negative pulse such that a positive pulse of increased amplitude is introduced to the control grid of the tube 463. The tube 463 amplifies and inverts this positive pulse and introduces a negative pulse of increased amplitude to the control grid of the tube 428.

The amplified negative pulse introduced to the control grid of the tube 428 produces a decrease in the flow of current through the tube 428. This causes the effective impedance of the tube 428 to be increased. This increase in the effective impedance of the tube 428 produces a decrease in the amplitude of the alternating voltage introduced by the secondary winding 424 to the photoelectric tubes 56 and 66. Because of the decrease in the potential introduced to the photoelectric tubes 56 and 66, the current flowing through these devices decreases to a safe level. In this way, the regulator circuit operates to make certain that under no condition will excessive currents flow in the photoelectric tubes 56 or 66 to damage the tubes.

To adjust the system for proper operation, the test switch 37 in FIGURES 1 and 17 may first be shifted to its a position. This prevents the alternating potential on the arm 451 from being applied to the switch 107 and the anode of the tube 362. It also causes the resistance 455 and the meter 480 to be connected to the movable arm of the potentiometer 371 so that a visual indication can be provided as to the bias voltage applied to the control grid of tube 362 through the resistor 374. In this way, the movable arm of the potentiometer 371 can be manually adjusted in position until the meter 480 reads a previously calibrated value corresponding to a desired voltage on the grid of the tube 362. This desired voltage has an amplitude which will just cause the tube 362 to fire in the absence of a signal on the control grid of the tube and which will cause the tube to be nonconductive upon the introduction to the control grid of a negative signal.

The test switch 37 may next be shifted to its c position. This effectively connects the control grids of the tubes 362 and 460 such that the signal representing eggs having bloodspots is introduced to the grid of the tube 460. The tube 460 substantially reproduces across its cathode resistor 467 the alternating voltage signal applied to its grid. As previously described, this signal initially has a positive amplitude during the charge of the capacitance 360 and then has a negative amplitude during the discharge of the capacitance.

The diode 482 provides a low impedance path for the negative portion of the signal produced across the resistor 467. Since the diode 482 is connected across the meter 480 and the resistor 461, the meter 480 cannot provide an indication of the negative portion of the signal produced across the resistor 467. In this way, the meter 480 indicates in the c position of the switch 37 only the positive portion of the signal produced across the resistance 467. This signal indicates the presence of a blood spot in an egg. The amplitude of the indication provided in the meter 480 is limited to a safe value by the resistance 461. By including the cathode follower stage formed in part by the tube 460, the impedance presented to the meter 480 becomes relatively low thus preventing any loading of the grid circuit of the tube 362.

When the switch 37 is in its c position, the movable arm in the potentiometer 323 can be adjusted so that no signal is impressed on the control grid of the gaseous discharge tube 362 for eggs having no blood spots, as represented by a zero indication in the meter 480. This adjustment can be made by placing one of the light filters 84 in FIGURE 3 over the aperture 46. In this position of the light filter 84, the average intensity of the light passing to the photoelectric tube 56 is substantially equal to the average intensity of the light passing to the photoelectric tube 66. The balancing arm of the potentiometer 323 can then be adjusted to compensate for any unbalance in the characteristics of the photoelectric tubes, as indicated by a zero signal in the meter 480.

The invention provides, therefore, improved and reliable apparatus for testing specimens such as eggs to determine whether or not the specimens contain a particular material such as blood spots. The apparatus automatically causes the specimens free of the particular material to be directed to a first receiving station and the specimens containing the particular material to be directed to a second receiving station.

We claim:

1. In apparatus for testing for the presence of a particular material in a specimen, having the property of translating only at a first wavelength a subtsantially constant percentage of a light beam incident on the specimen regardless of the presence or absence of the particular material therein, of translating only at a second wavelength higher than said first wavelength a substantially constant percentage of a light beam incident on the specimen regardless of the presence or absence of the particular material therein, and of translating only at a third wavelength intermediate said first and second wavelengths a different percentage of the light beam incident on the specimen in the presence of the particular material in the specimen as compared with the absence of the particular material in the specimen, the combination of means for directing light at the specimen, first photoelectric means, first filter means for passing to said first photoelectric means light translated by the specimen at the first and second wavelengths, means for averaging the intensity of the light translated at the first and second wavelengths, second photoelectric means, second filter means for passing to said second photoelectric means light translated by the specimen at the third wavelength, a control network coupled to said first and second photoelectric means to produce a control signal representative of the combined outputs of said first and second photoelectric means, and electronic means responsive to said control signal for producing a control effect indicative of the presence or absence of the particular material in the specimen.

2. The combination defined in claim 1 in which said first and second photoelectric means produce control pulses having substantially the same amplitude in the absence of the particular material in the specimen and having materially different amplitudes in the presence of the particular material in the specimen and in which said control network produces a control pulse only in the presence of the particular material in the specimen.

3. In apparatus for testing for the presence of a particular material in a specimen, having the property of translating at a first wavelength a substantially constant percentage of light incident on the specimen regardless of the presence or absence of the particular material in the specimen, of translating at a second wavelength higher than said first wavelength a substantially constant percentage of light incident on the specimen regardless of the presence or absence of the particular material in the specimen, and of translating at a third wavelength intermediate said first and second wavelengths a different percentage of light incident on the specimen in the presence of the particular material as compared with the amount of light incident on the specimen in the absence of the particular material, the combination of a conveyor constructed to provide a movement of the specimen, means coupled to the conveyor for providing movement of the conveyor, means for directing light at the specimen, first photoelectric means, first filter means formed of two separate portions, one portion being designed to pass light at only the first wave length and a second portion being designed to pass light at only the second wave length for passing to said first photoelectric means light translated by the specimen at the first and second wavelengths, means for averaging the intensity of the light passed through said filters, second photoelectric means, second filter means constructed to pass to said second photoelectric means only light translated by the specimen at the third wavelength, a control network coupled to said first and second photoelectric means to produce a control pulse indicative of the difference between the electrical output of said first and second photoelectric means, a solenoid, means included in the conveyor and actuated by the solenoid upon the detection of the particular material in the specimens for obtaining a separation of such specimens by the conveyor means during the movement of such specimens with the conveyor means from the other specimens during the movement of the other specimens with the conveyor means and an actuating circuit for said solenoid responsive to said control pulse to actuate said solenoid upon the detection of the presence of the particular material in the specimen for a separation of the specimens with the particular material from the specimens without the particular material.

4. In apparatus for testing for the presence of a particular material in each of a series of specimens, the combination of a conveyor for drawing the specimens in succession past a testing station, a light source at the testing station for directing light through the specimens as they are drawn past the testing station by said conveyor, a first photoelectric tube and a second photoelectric tube, filter means for passing light at one wavelength from the specimens to said first photoelectric tube and for passing light at a second wavelength from the specimens to said second photoelectric tube, a series of actuating members on said conveyor respectively mounted to be adjacent corresponding ones of the specimens carried thereby, means including a solenoid for pivoting invidual ones of said actuating members from a first to a second position, a control circuit coupled to said first and second photoelectric tubes for controlling the operation of said solenoid in response to the outputs from such tubes, thereby to position successive ones of said actuating members in said first or said second position depending upon the presence or the absence of the particular material in the specimens respectively corresponding thereto, and a discriminating mechanism controlled by said actuating members to supply a specimen to a first receiving station when the one of said actuating members corresponding thereto is in said first position and to supply a specimen to a second receiving station when the one of said actuating members corresponding thereto is in said position.

5. In apparatus for testing for the presence of blood spots in each of a plurality of eggs, the combination of a conveyor for transporting the eggs in succession past a testing station, a light source at the testing station for directing light through the eggs as they are drawn past the testing station by said conveyor, a first photoelectric tube and a second photoelectric tube, a first filter for passing light at two different wavelengths from the eggs to said first photoelectric tube, a second filter for passing light at a wavelength intermediate said two different wavelengths from the eggs to said second photoelectric tube, a series of pivoted actuating dogs on said conveyor respectively mounted to be adjacent corresponding ones of the eggs carried thereby, a comparator circuit coupled to said first and second photoelectric tubes for developing a control signal having an amplitude in excess of a certain threshold only for eggs having a blood spot therein, means including a solenoid for pivoting individual ones of said actuating dogs from a first to a second position, a control circuit for said solenoid coupled to said comparator circuit and energizing said solenoid whenever the amplitude of said control signal exceeds said threshold, thereby to pivot to said second position respective ones of said dogs corresponding to eggs having a blood spot therein, means for guiding eggs from said conveyor to a first receiving station, and mechanical switching means included in said guiding means and actuated by each of said dogs in said second position for guiding eggs from said conveyor to a second receiving station.

6. The combination defined in claim 5 and which further includes a series of shields rotatable about a central axis by the specimens carried by the conveyor to shield said photoelectric means from said light source between successive ones of such specimens.

7. In apparatus for testing for the presence of a particular material in each of a plurality of specimens, the combination of a conveyor for drawing the specimens successively past a testing station, a light source at the testing station for directing light through the specimens as they are drawn past the testing station by said conveyor, photoelectric means, filter means for passing to said photoelectric means light translated by the specimens, a plurality of actuating members on said conveyor and respectively mounted to be adjacent corresponding ones of the specimens carried by the conveyor, means including a solenoid for moving individual ones of said actuating members from a first to a second position, a control circuit coupled to said photoelectric means for selectively energizing said solenoid, in response to the percentage of light translated by certain ones of the specimens, a discriminating mechanism operated by said actuating members in accordance with the displaced position of such members to separate specimens having the particular material from specimens free of the particular material and a series of shields rotatable about a central axis by the specimens carried by the conveyor to shield said photoelectric means from said light source between successive ones of said specimens.

8. In apparatus for testing for the presence of a particular material in each of a plurality of specimens, the combination of a conveyor for drawing the specimens successively past a testing station, a light source at the testing station for directing light through the specimens as they are drawn past the testing station by said conveyor, photoelectric means, filter means for passing to said photoelectric means light translated by the specimens, a plurality of actuating members on said conveyor and respectively mounted to be adjacent corresponding ones of the specimens carried by the conveyor, means including a solenoid for moving individual ones of said actuating members from a first to a second position, a control circuit coupled to said photoelectric means for selectively energizing said solenoid, in response to the percentage of light translated by certain ones of the specimens, a discriminating mechanism operated by said actuating members in accordance with the displaced position of such members to separate specimens having the particular material from specimens free of the particular material said discriminating mechanism including track means for guiding the specimens from said conveyor to a first receiving station, and said discriminating mechanism further including a pivoted yoke spring biased to a first position and actuated to a second position by each of said actuating members in the displaced position of said actuating members to obtain a movement of the specimens to a second receiving station.

9. In apparatus for testing for the presence of a particular material in each of a plurality of specimens, the combination of a conveyor for drawing the specimens successively past a testing station, a light source at the testing station for directing light through the specimens as they are drawn past the testing station by said conveyor, photoelectric means, filter means for passing to said photoelectric means light translated by the specimens, a plurality of actuating members on said conveyor and respectively mounted to be adjacent corresponding ones of the specimens carried by the conveyor, means including a solenoid for moving individual ones of said actuating members from a first to a second position, a control circuit coupled to said photoelectric means for selectively energizing said solenoid, in response to the percentage of light translated by certain ones of the specimens, a discriminating mechanism operated by said actuating members in accordance with the displaced position of such members to separate specimens having the particular material from specimens free of the particular material said actuating members each being in the form of a dog pivoted to said conveyor and having a radially extending arm, said dog being pivotable between an inoperative position and a position in which said arm engages said discriminating mechanism.

10. Apparatus for detecting the presence of blood in an intact egg comprising a source of light positioned to pass light through the egg, means to split the beam of light passing through said egg into two beams, a filter positioned in one beam adapted to filter light at approximately 575 millimicrons, a pair of filters positioned in the other beam adapted to filter light at approximately 555 and 595 millimicrons each respectively, a first photoelectric tube adapted to measure the intensity of the light passing through the first mentioned filter, a second photoelectric tube adapted to measure the combined average intensities of the light passing through said 555 and 595 millimicron filters, electronic means for measuring and signaling the difference in amplitude of the output of said photoelectric tubes and rejecting means controlled by said electronic means actuated by the signal responsive to a difference in amplitude of the output of said photoelectric tubes whereby intact eggs containing blood are ejected from a conveying mechanism.

11. Apparatus according to claim 10 in which the first mentioned filter filters light in the range of 575 millimicrons and the second and third mentioned filters filter light in the range of 565 and 600 millimicrons respectively.

12. Apparatus for the detection of the presence of a particular material in a substance containing a plurality of materials comprising a light source, means for passing the substance past said light source, means positioned to receive light from material being tested adapted to split said light into two beams, a first filter positioned in a first of said two beams adapted to pass light to a first photoelectric tube at a selected wavelength, second and third filters positioned in the second of said two beams adapted to pass light to a second photoelectric tube at selected wavelengths above and below the first mentioned wavelength, means for averaging the intensity of the light passing through said second and third filters, electronic means for measuring the output of said photoelectric tubes, electronic means for comparing the intensity of the output from said tubes and control means actuated in response to a difference between the compared intensities of said tubes.

13. In combination for testing for the presence of a particular material in specimens, which specimens are adapted to pass light at a first wavelength at which a substantial portion of the light is absorbed by the presence of said particular material therein, and which specimens are adapted to pass light at a second wavelength displaced from said first wavelength at which the intensity of light is substantially unaffected by the presence of said particular material therein, and which specimens are adapted to pass light at a third wavelength different from said second wavelength and from said first wavelength at which the intensity of light is likewise substantially unaffected by the presence of said particular material therein, conveyor means for the specimens, means coupled to the conveyor means for causing the conveyor means to move along a particular path, a source of light disposed adjacent said path at a particular position with respect thereto for directing light at successive ones of the specimens on the conveyor means upon movement of the conveyor means along said particular path for the passage of light through successive ones of the specimens at said first wavelength and at said second and third wavelengths, first filter means positioned to receive light from said source passing through successive ones of the specimens and responsive to light from the specimens selectively to pass the light at the first wavelength, second filter means positioned to receive light from said source passing through successive ones of the specimens and responsive to light from the specimens selectively to pass the light at the second and third wavelengths, means including a first photo tube responsive to the light passing through the first filter means for each specimen at the first wavelength to produce a first signal having an amplitude proportional to the amount of light received by the first photo tube, means including a second photo tube responsive to the light passing through the second filter means for each specimen at the second and third wavelengths to produce a second signal having an amplitude proportional to the amount of light received by the second photo tube, electronic means coupled to the first and second photo tubes and responsive to the first and second signals for comparing the amplitude of the first and second signals to produce a control signal representative of any differences between such amplitudes, and means including actuable means disposed at a particular position along said path and responsive to said control signal to separate the specimens without the particular material from the specimens containing the particular material as the specimens are moved by said conveyor means along said path.

14. In combination for testing for the presence of blood spots in eggs, which eggs are adapted to pass light at a first wavelength at which a substantial portion of the light is absorbed by the presence of blood spots therein, and which eggs are adapted to pass light at a second wavelength displaced from said first wavelength at which the intensity of the light is substantially unaffected by the presence of blood spots therein, and which eggs are adapted to pass light at a third wavelength different from said second wavelength and from said first wavelength at which the intensity of the light is likewise unaffected by the presence of blood spots therein, conveyor means for the eggs, means coupled to the conveyor means for causing the conveyor means to move intermittently along a particular path, a source of light disposed adjacent said path at a particular position with respect to said path for directing light at successive ones of the eggs on the conveyor means as the eggs are momentarily supported at said particular position by the intermittent motion of the conveyor means, the light from the source being directed at successive ones of the eggs at the particular position for the passage of light through the eggs at said first wavelength and at said second and third wavelengths, first means including filter means responsive to the light passing through the eggs at the first wavelength for producing a first signal having an amplitude proportional to the amount of light passing through the eggs at said first wavelength, second means spaced from said first means including a second filter means responsive to the light passing through the eggs at the second and third wavelengths for producing a second signal having an amplitude proportional to the amount of light passing through the eggs at the second and third wavelengths, means for directing the light passing through the eggs from said portion to said first means and to said second means along separate paths, electronic means coupled to said first and second means and responsive to the first and second signals therefrom for comparing the amplitudes thereof, to produce an output signal corresponding to the difference between such amplitudes, and means disposed adjacent said path and coupled to said electronic means to be actuated by said output signal for separating the eggs having blood spots therein from eggs free from blood spots upon the movement of the eggs by said conveyors means passing said particular position.

15. In apparatus for testing for the presence of a particular material in each of a plurality of specimens, which specimens are adapted to pass light at a first wavelength at which a substantial portion thereof is absorbed by the presence of said particular material therein, and which specimens are adapted to pass light at a second wavelength displaced from said first wavelength at which the intensity thereof is substantially unaffected by the presence of said particular material therein, the combination of a conveyor constructed to provide movement of the specimens along a particular path, a testing station positioned adjacent said path, a light source positioned at the testing station for directing light at successive ones of the specimens as the specimens are moved past the testing station by said conveyor in a direction to permit the passage of light through successive ones of said specimens at said first wavelength and at said second wavelength, photoelectric means, filter means responsive to the light transmitted through the specimens for selectively passing to said photoelectric means light at said first wavelength and at said second wavelength, a plurality of actuating members on said conveyor and respectively mounted to be adjacent corresponding ones of the specimens carried by the conveyor, means including a solenoid coupled to the actuating members in the plurality for moving individual ones of said actuating members from a first position to a second position upon the occurrence of the particular material in the specimens, means coupled to the photoelectric means for respectively producing first and second signals in response to the light passing to the photoelectric means at the first and second wavelengths, a control circuit coupled to said photoelectric means for comparing the first and second signals selectively to energize said solenoid in response to differences in the first and second signals, and a discriminating mechanism operated by said actuating members in accordance with the disposition of such members in the second position to separate specimens having the particular material from specimens free of the particular material.

16. In apparatus for testing for the presence of blood spots in each of a plurality of eggs, which eggs are adapted to pass light at a first wavelength at which a substantial portion thereof is absorbed by the presence of a blood spot therein, and which eggs are adapted to pass light at a second wavelength displaced from said first wavelength at which the intensity thereof is substantially unaffected by the presence of blood spots therein, the combination of: a conveyor constructed to provide movement of the eggs along a particular path, a testing station positioned adjacent said path, a light source positioned at the testing station for directing light at successive ones of the eggs as the eggs are moved past the testing station by said conveyor in a direction to permit the passage of light through successive ones of said eggs at said first wavelength and at said second wavelength, photoelectric means, filtering means responsive to the light transmitted through the eggs for selectively passing to said photoelectric means light at said first wavelength and at said second wavelength, actuating means mounted to be adjacent the eggs carried by the conveyor for effecting the selective removal of the eggs from the conveyor, control means for moving said actuating means from a first position to a second position upon the occurrence of a blood spot in the eggs, means coupled to the photoelectric means for respectively producing first and second signals in response to the light passing to the photoelectric means at the first and second wavelengths, a control circuit coupled to said photoelectric means for comparing the first and second signals selectively to activate said control means in response to differences in the first and second signals, and a discriminating mechanism operated by said actuating means in accordance with the disposition of the actuating means in the second position to separate eggs having a blood spot therein from eggs free from blood spots.

17. In apparatus for testing for the presence of blood spots in each of a plurality of eggs, which eggs are adapted to pass light at a first wavelength at which a substantial portion thereof is absorbed by the presence of blood spots therein, and which eggs are adapted to pass light at a second wavelength displaced from said first wavelength at which the intensity thereof is substantially unaffected by the presence of blood spots therein, the combination of: a conveyor constructed to provide movement of the eggs along a particular path, a testing station positioned adjacent said path, a light source positioned at the testing station for directing light at successive ones of the eggs as the eggs are moved past the testing station by said conveyor in a direction to permit the passage of light through successive ones of said eggs at said first wavelength and at said second wavelength, photoelectric means, filter means responsive to the light transmitted through the eggs for selectively passing to said photoelectric means light at said first wavelength and at said second wavelength, actuating means mounted to be adjacent the eggs carried by the conveyor for effecting the selective removal of eggs from the conveyor, means coupled to said photoelectric means for respectively producing first and second signals in response to the light passing to the photoelectric means at the first and second wavelengths, and a control circuit coupled to said photoelectric means for comparing the first and second signals selectively to activate said actuating means in response to differences in said first and second signals.

References Cited in the file of this patent

UNITED STATES PATENTS

| | | |
|---|---|---|
| 1,626,359 | Rundell | Apr. 26, 1927 |
| 1,810,172 | Hayes | June 16, 1931 |
| 1,960,231 | Cooper | May 29, 1934 |
| 2,175,262 | Haugh | Oct. 10, 1939 |
| 2,183,606 | Day | Dec. 19, 1939 |
| 2,625,265 | Cox | Jan. 13, 1953 |
| 2,678,725 | Jacobson | May 18, 1954 |
| 2,696,297 | Matthews | Dec. 7, 1954 |
| 2,700,321 | Brant et al. | Jan. 25, 1955 |
| 2,708,515 | Bliss | May 17, 1955 |
| 2,774,961 | Orlando | Dec. 18, 1956 |
| 2,823,800 | Bliss | Feb. 18, 1958 |

FOREIGN PATENTS

| | | |
|---|---|---|
| 166,374 | Australia | Dec. 20, 1955 |

OTHER REFERENCES

"Electronics," March 1937, pages 28–29. (Copy in Div. 37.)